US011413878B2

(12) United States Patent
Kurihara et al.

(10) Patent No.: US 11,413,878 B2
(45) Date of Patent: Aug. 16, 2022

(54) DRAWING METHOD, ERASING METHOD, AND DRAWING APPARATUS

(71) Applicant: SONY CORPORATION, Tokyo (JP)

(72) Inventors: Kenichi Kurihara, Kanagawa (JP); Taichi Takeuchi, Kanagawa (JP); Asuka Tejima, Kanagawa (JP); Aya Shuto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/957,137

(22) PCT Filed: Oct. 10, 2019

(86) PCT No.: PCT/JP2019/039981
§ 371 (c)(1),
(2) Date: Jun. 23, 2020

(87) PCT Pub. No.: WO2020/090402
PCT Pub. Date: May 7, 2020

(65) Prior Publication Data
US 2021/0370688 A1 Dec. 2, 2021

(30) Foreign Application Priority Data
Oct. 30, 2018 (JP) .............................. JP2018-204198

(51) Int. Cl.
B41J 2/44 (2006.01)
B41J 2/47 (2006.01)
(Continued)

(52) U.S. Cl.
CPC .................. B41J 2/442 (2013.01); B41J 2/47
(2013.01); B41J 2/4753 (2013.01); B41M 5/305 (2013.01);
(Continued)

(58) Field of Classification Search
CPC ... B41J 2/442; B41J 2/47; B41J 2/4753; B41J 2002/4756; B41M 5/305;
(Continued)

(56) References Cited

U.S. PATENT DOCUMENTS

2004/0085869 A1* 5/2004 Takehara ............. G11B 7/0956
369/44.32
2005/0197250 A1* 9/2005 Kawahara ............. B41M 5/305
503/201
(Continued)

FOREIGN PATENT DOCUMENTS

EP 0842787 A1 5/1998
EP 2392468 A1 12/2011
(Continued)

OTHER PUBLICATIONS

International Search Report prepared by the Japan Patent Office dated Dec. 6, 2019, for International Application No. PCT/JP2019/039981.

Primary Examiner — Matthew Luu
Assistant Examiner — Kendrick X Liu
(74) Attorney, Agent, or Firm — Sheridan Ross P.C.

(57) ABSTRACT

A drawing method according to an embodiment of the present disclosure includes, when performing drawing on a thermal recording medium that includes a light-transmitting member above a recording layer, obtaining information regarding the light-transmitting member, predicting an optical axis deviation of a laser beam in the recording layer from the information regarding the light-transmitting member, and calculating a correction amount from a result of the prediction of the optical axis deviation.

20 Claims, 18 Drawing Sheets

(51) Int. Cl.
*B41M 5/30* (2006.01)
*G11B 7/0037* (2006.01)
*G11B 7/0055* (2006.01)
*G11B 7/24053* (2013.01)
*G11B 7/24056* (2013.01)
*B41J 2/475* (2006.01)
*G11B 7/00* (2006.01)

(52) U.S. Cl.
CPC ...... *G11B 7/00375* (2013.01); *G11B 7/00552* (2013.01); *G11B 7/24053* (2013.01); *G11B 7/24056* (2013.01); B41J 2002/4756 (2013.01); G11B 2007/0006 (2013.01); G11B 2007/0016 (2013.01)

(58) Field of Classification Search
CPC .... G11B 2007/0006; G11B 2007/0016; G11B 7/00375; G11B 7/00552; G11B 7/24053; G11B 7/24056
See application file for complete search history.

(56) References Cited

U.S. PATENT DOCUMENTS

| | | | |
|---|---|---|---|
| 2006/0018243 A1* | 1/2006 | Ohtsubo | G11B 7/24094 369/272.1 |
| 2006/0233070 A1* | 10/2006 | Kurokawa | G11B 7/0943 369/44.23 |
| 2008/0008963 A1 | 1/2008 | Tamura et al. | |
| 2014/0030531 A1 | 1/2014 | Mori | |
| 2014/0240808 A1 | 8/2014 | Yamamoto et al. | |

FOREIGN PATENT DOCUMENTS

| | | |
|---|---|---|
| JP | 2000-141721 | 5/2000 |
| JP | 2003-118152 | 4/2003 |
| JP | 2004-188827 | 7/2004 |
| JP | 2005271315 A | 10/2005 |
| JP | 2008-037098 | 2/2008 |
| JP | 2014-164205 | 9/2014 |
| JP | 2015174430 A | 10/2015 |
| WO | WO 2010/056116 | 5/2010 |

* cited by examiner w/o MLA (A)    (B)

w MLA

DRAWING METHOD, ERASING METHOD, AND DRAWING APPARATUS

CROSS REFERENCE TO RELATED APPLICATIONS

This application is a national stage application under 35 U.S.C. 371 and claims the benefit of PCT Application No. PCT/JP2019/039981 having an international filing date of 10 Oct. 2019, which designated the United States, which PCT application claimed the benefit of Japanese Patent Application No. 2018-204198 filed 30 Oct. 2018, the entire disclosures of each of which are incorporated herein by reference.

TECHNICAL FIELD

The present disclosure relates to a drawing method, an erasing method, and a drawing apparatus that are used on, for example, a thermal recording medium having an uneven shape in a surface.

BACKGROUND ART

In recent years, due to growing customer needs for customization, development of a thermal recording technique that performs drawing using a laser has been promoted as one of what is called non-contact type on-demand decorating techniques. Unlike a contact-type recording method using a thermal head, for example, the thermal recording technique using a laser allows noncontact recording, thus making it possible to perform writing of information (drawing) without a thermal recording layer included in an outermost surface.

As a drawing apparatus that performs drawing using a laser, for example, PTL1 discloses a recording apparatus that includes a laser-beam oscillator, a scanner, a modulator, and a lens system. The laser-beam oscillator irradiates, with a plurality of laser beams each having a different wavelength, a reversible multicolor recording medium that includes a plurality of reversible thermal color-developing compositions each having a different color development tone. The scanner performs scanning on a surface of the reversible multicolor recording medium with a laser beam. The modulator selectively modulates an output of the laser beam in association with a scanning position and recording information. The lens system causes the plurality of laser beams each having a different wavelength to enter a light deflector from a different direction.

CITATION LIST

Patent Literature

PTL 1: Japanese Unexamined Patent Application Publication No. 2004-188827

SUMMARY OF THE INVENTION

Meanwhile, in a thermal recording medium used for decoration, a surface decoration member provided on a thermal recording layer does not necessarily have a uniform thickness. For example, a case where the surface decoration member has a geometrical cross-sectional shape is assumed. In such a case, a refraction of a laser beam or variation in beam diameter, etc. occur at a surface of the surface decoration member, which is likely to cause a distortion of a drawn image or drawing unevenness, and result in a deterioration in display quality. Deterioration in display quality when used for decoration is to cause a significant damage to a product value.

Therefore, it is desirable to provide a drawing method, an erasing method, and a drawing apparatus that make it possible to improve display quality.

In a drawing method according to an embodiment of the present disclosure, when performing drawing on a thermal recording medium that includes a light-transmitting member above a recording layer, information regarding the light-transmitting member is obtained, to predict an optical axis deviation of a laser beam in the recording layer from the information regarding the light-transmitting member, and calculate a correction amount from a result of the prediction of the optical axis deviation.

In an erasing method according to an embodiment of the present disclosure, when erasing an image from a thermal recording medium that includes a light-transmitting member above a recording layer, information regarding the light-transmitting member is obtained, to predict an optical axis deviation of a laser beam in the recording layer from the information regarding the light-transmitting member, and calculate a correction amount from a result of the prediction of the optical axis deviation.

A drawing apparatus according to an embodiment of the present disclosure includes a light source section, a scanner section, a reception section, and a correction section. The light source section emits a laser beam. The scanner section performs scanning, with the laser beam emitted from the light source section, on a thermal recording medium that includes a light-transmitting member above a recording layer. The reception section obtains information regarding the light-transmitting member. The correction section predicts, from the information regarding the light-transmitting member that is obtained by the reception section, an optical axis deviation, in the recording layer, of the laser beam transmitted through the light-transmitting member, and calculates a correction amount from tire result of the prediction.

In the drawing method according to an embodiment of the present disclosure, the erasing method according to the embodiment, and the drawing apparatus according to the embodiment, information regarding the light-transmitting member is obtained, to predict, from the information regarding the light-transmitting member, the optical axis deviation of the laser beam on tire recording layer and calculate a correction amount from the result of the prediction of the optical axis deviation of the laser beam, thereby performing drawing on the recording layer or erasing of an image drawn on the recording layer irrespective of a shape of the light-transmitting member.

MODES FOR CARRYING OUT THE INVENTION

In the following, embodiments of the present disclosure are described in detail with reference to drawings. The following description is a specific example of the present disclosure, and the present disclosure is not limited to the following embodiments. In addition, the present disclosure is not limited to a position, size, and proportion, etc. of each component illustrated in each chawing, either. It is to be noted that the description is given in the following order.

1. First Embodiment (an example of a drawing method and an erasing method in which an optical axis deviation due to a light-transmitting member is corrected using an optical member)
   1-1. Configuration of Thermal Recording Medium
   1-2. Manufacturing Method of Thermal Recording Medium
   1-3. Configuration of Drawing and Erasing Apparatus
   1-4. Drawing Method and Erasing Method
   1-5. Workings and Effects
2. Second Embodiment (an example of a drawing method and an erasing method in winch an optical axis deviation due to the light-transmitting member is corrected by moving a stage)
   2-1. Configuration of Drawing and Erasing Apparatus
   2-2. Drawing method and Erasing Method
   2-3. Workings and Effects
3. Third Embodiment (an example of a drawing method and an erasing method in which drawing or erasing is performed using a correction image signal generated as a result of correcting an input image)
   3-1. Configuration of Drawing and Erasing Apparatus
   3-2. Drawing Method and Erasing Method
   3-3. Workings and Effects
4. Application Examples
5. Examples

1. FIRST EMBODIMENT

Figure 1:
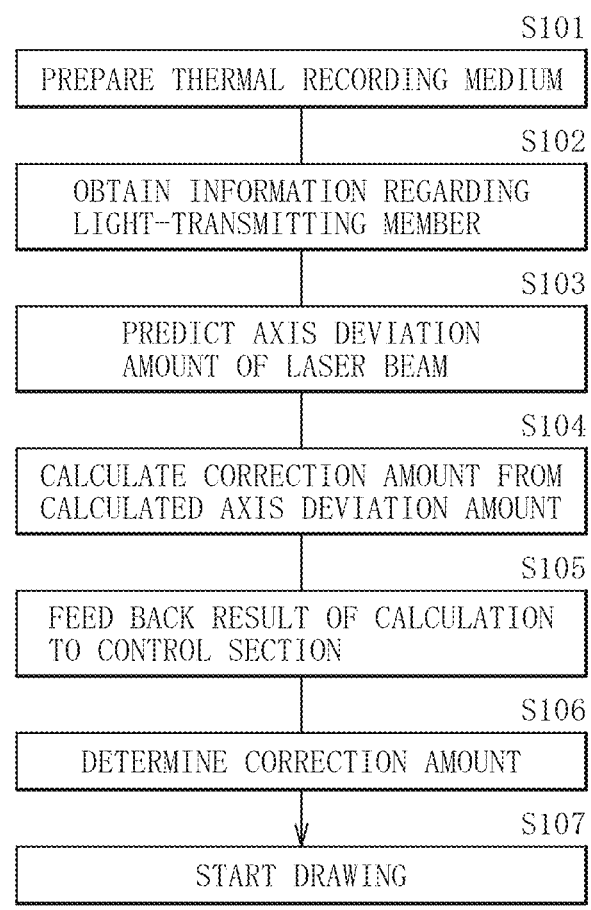
FIG. 1 illustrates a procedure of a drawing method performed on a thermal recording medium according to a first embodiment of the present disclosure.
Figure 2:
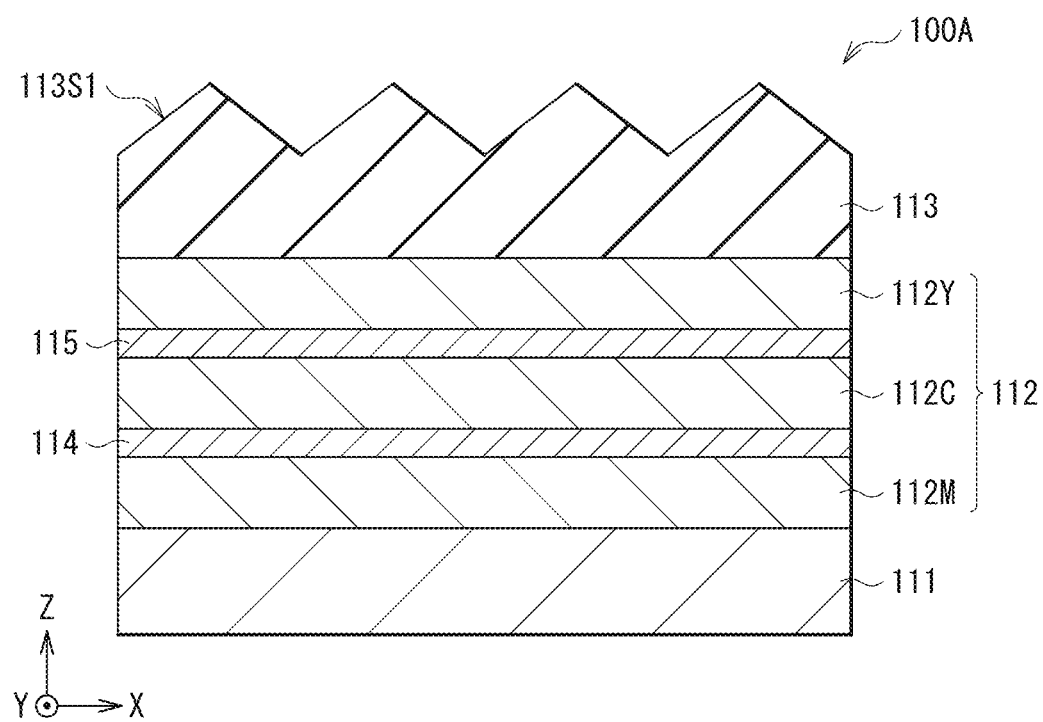
FIG. 2 is a schematic cross-sectional diagram that illustrates an example of a configuration of the thermal recording medium.
Figure 3:
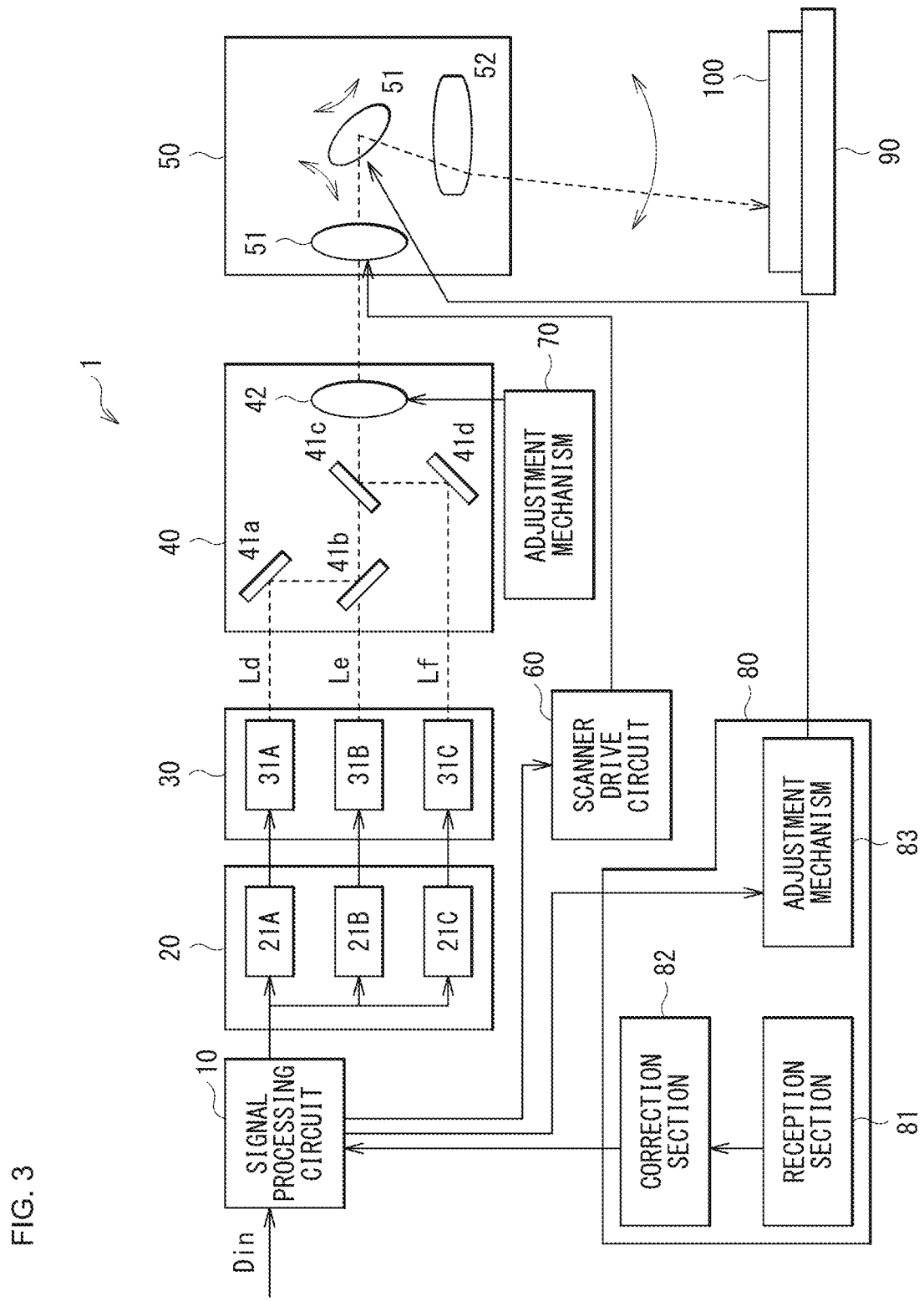
FIG. 3 illustrates an example of a system configuration of a drawing and erasing apparatus according to the first embodiment of the present disclosure.

FIG. 1 illustrates a procedure of a drawing method performed on a thermal recording medium (thermal recording medium 100) according to a first embodiment of the present disclosure. FIG. 2 schematically illustrates an example of a cross-sectional configuration of the thermal recording medium 100. FIG. 3 illustrates an example of a system configuration of a drawing and erasing apparatus (drawing and erasing apparatus 1) according to the first embodiment of the present disclosure. For example, the thermal recording medium 100 is a reversible recording medium that allows reversible recording and erasing of information by heat. For example, in the thermal recording medium 100, a light-transmitting member 113 having an uneven shape in a plane is provided on a recording layer 12 that is provided on a support substrate 111 and able to reversibly vary a recording state and an erasing state.

In the drawing method and the erasing method according to the present embodiment, information regarding the light-transmitting member 113 is obtained, to predict an optical axis deviation of a laser beam L on the recording layer 112 from the information regarding the light-transmitting member 113 and calculate a correction amount from a result of the prediction of the optical axis deviation of the laser beam L, to subsequently perform drawing on the recording layer 112 or erasing of an image drawn on the recording layer 112. According to the present embodiment, an entrance angle or an entrance position of the laser beam L with respect to the light-transmitting member 113 in the thermal recording medium 100 is corrected using an optical member (uniaxial scanner 51). This makes it possible to perform homogeneous drawing on the recording layer 112.

First, the thermal recording medium 100, and the drawing and erasing apparatus 1 are described in order, and subsequently the drawing method and the erasing method performed on the thermal recording medium 100 are described in detail.

(1-1. Configuration of Thermal Recording Medium)

FIG. 2 illustrates a cross-sectional configuration of a thermal recording medium 100A that is a specific example of the thermal recording medium 100 illustrated in FIG. 1. It is to be noted that the thermal recording medium 100A illustrated in FIG. 2 schematically illustrates a cross-sectional configuration, and has a size and shape different from an actual size and shape in some cases. For example, the thermal recording medium 100A includes, on the support substrate 111, the recording layer 112 that is able to reversibly vary the recording state and the erasing state. For example, this recording layer 112 has a configuration in which three layers having color development tones different from each other (recording layer 112M, recording layer 112C, and recording layer 112Y) are stacked in this order. Between the recording layer 112M and the recording layer 112C, and between the recording layer 112C and the recording layer 112Y, heat insulating layers 114 and 115 each including a plurality of layers (here, three layers) are provided, respectively. On the recording layer 112Y, the light-transmitting member 113 is provided.

The support substrate 111 is provided to support tire recording layer 112. The support substrate 111 includes a material having high heat resistance and high dimensional stability in a planar direction. The support substrate 111 may have either light transmissivity or non-light transmissivity. For example, the support substrate 111 may be a substrate having a rigidity such as a wafer, or may include a thin-layer glass, film, paper, or the like having flexibility. Using a flexible substrate as the support substrate 111 makes it possible to achieve a flexible (bendable) reversible recording medium.

Examples of a composition material of the support, substrate 111 include an inorganic material, a metal material a polymeric material such as plastic, and the like. Specifically, examples of the inorganic material include silicon (Si), silicon oxide ($SiO_x$), silicon nitride ($SiN_x$), aluminum oxide ($AlO_x$), magnesium oxide ($MgO_x$), and the like. Silicon oxide includes glass, spin-on glass (SOG), or the like. Examples of the metal material include metal alone such as aluminum (Al), copper (Cu), silver (Ag), gold (Au), platinum (Pt), palladium (Pd), nickel (Ni), tin (Sn), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (Sb), and lead (Pb) or an alloy that includes two or more of these. Specific examples of the alloy include stainless steel (SOS), an aluminum alloy, a magnesium alloy, and a titanium alloy. The polymeric material includes phenolic resin, epoxy resin, melamine resin, urea resin, unsaturated polyester resin, alkyd resin, urethane resin, polyamide, polyethylene, high density polyethylene, medium density polyethylene, low density polyethylene, polypropylene, polyvinyl chloride (PVC), polyvinylidene chloride, polystyrene, polyvinyl acetate, polyurethane, acrylonitrile butadiene-styrene resin (ABS), acrylic resin (PMMA), polyamide, nylon, polyacetal, polycarbonate (PC), modified polyphenylene ether, polyethylene telephthalate (PET), polybutylene terephthalate, cyclic polyolefin, polyphenylene sulfide, polytetrafluoroethylene (PTFE), polysulphone, polyethersulfone, amorphous polyarylate, liquid crystal polymer, polyetheretberketone (PEEK), polyamide imide, polyethylene naphthalate (PEN), triacetyl cellulose, cellulose, or a copolymer of these, glass fiber reinforced plastic, carbon-fiber reinforced plastic (CFRP), or the like.

It is to be noted that it is preferable to provide a reflection layer (not illustrated) in an upper surface or a lower surface of the support substrate 11. Providing the reflection layer makes it possible to achieve more vivid color display.

The recording layer 112 allows reversible writing and erasing of information by heat, and is configured using a material that allows stable repeated recording and control of a decoloring state and a color-developing state. The recording layer 112 includes, for example, the recording layer 112M that is to turn magenta (M), the recording layer 112C that is to turn cyan (C), and the recording layer 112Y that is to turn, yellow (Y).

In the recording layer 112, for example, the recording layers 112M, 112C, and 112Y each include a polymeric material. The polymeric material includes a coloring compound (reversible thermal color-developing composition) that is to develop a color different from each another, a developer or developing/reducing agent corresponding to each coloring compound, and a photothermal converting agent that absorbs a light ray of a wavelength range different from each other to generate heat. This allows the thermal recording medium 100A to perform coloring as multicolor display. Specifically, for example, the recording layer 112M includes a coloring compound that is to turn magenta, a developing/reducing agent corresponding thereto, and for example, a photothermal converting agent that absorbs infrared light having an emission wavelength $\lambda 2$ to generate heat. For example, the recording layer 112C includes a coloring compound that is to turn cyan, a developing/reducing agent corresponding thereto, and for example, a photothermal converting agent that absorbs and develops infrared light having an emission wavelength $\lambda 2$. For example, the recording layer 112Y includes a coloring compound that is to turn yellow, and a developing/reducing agent corresponding thereto, and for example, a photothermal converting agent that absorbs infrared light having an emission wavelength $\lambda 3$ to generate heat. The emission wavelengths $\lambda 1$, $\lambda 2$, and $\lambda 3$ are different from each other, thereby making it possible to obtain a display medium that allows multicolor display.

It is to be noted that the recording layers 112M, 112C, and 112Y become transparent in the decoloring state. This allows the thermal recording medium 100A to perform recording in a wide color gamut. It is preferable that the recording layers 112M, 112C, and 112Y each have a thickness in a stacking direction (hereinafter, simply referred to as the thickness) of not less than 1 μm and not more than 20 μm, for example. More preferably, for example, the thickness is not less than 2 μm and not more than 15 μm. One reason for this is that if the recording layers 112M, 112C, and 112Y have a thickness of less than 1 μm, there is a possibility of not being able to obtain a sufficient color optical density. In addition, in a case where each of layers 22, 23, and 24 has a thickness larger than 20 μm, an amount of heat used by the recording layers 112M, 112C, and 112Y increases, winch is likely to result in a deterioration in color-developing or decoloring performance.

For example, the coloring compound includes a leuco dye. The leuco dye includes, for example, an existing dye for thermal paper. As an example of the coloring compound, there is a compound that includes, in a molecule, a group having an electron-donating property, for example, as represented by Formula (1) below.

[Chem. 1]

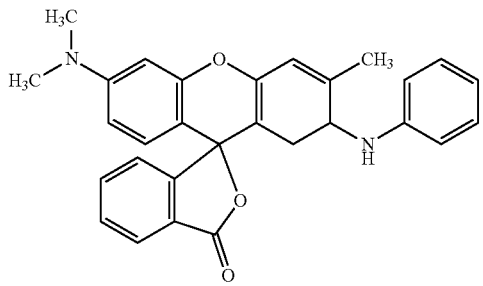

(1)

The coloring compound used in each recording layer 112M, 112C, and 112Y is not particularly limitative, and is selectable as appropriate in accordance with a purpose. Examples of a specific coloring compound other than the compound represented by Formula (1) above include a fluoran-based compound, a triphenylmethanephthalide-based compound, an azaphthalide-based compound, a phenothiazine-based compound, a leuco auramine-based compound, an indorinophthalide-based compound, and the like. Other than this, examples of the coloring compound include 2-anilino-3-methyl-6-diethylaminofluoran, 2-anilino-3-methyl-6-di(n-butylamino) fluoran, 2-anilino-3-methyl-6-(N-n-propyl-N-methylamino) fluoran, 2-anilino-3-methyl-6-(N-isopropyl-N-methylamino) fluoran, 2-anilino-3-methyl-6-(N-isobutyl-N-methylamino) fluoran, 2-anilino-3-methyl-6-(N-n-amyl-N-methylamino) fluoran, 2-anilino-3-methyl-6-(N-sec-butyl-N-methylamino) fluoran, 2-anilino-3-methyl-6-(N-n-amyl-N-ethylamino) fluoran, 2-anilino-3-methyl-6-(N-iso-amyl-N-ethylamino) fluoran, 2-anilino-3-methyl-6-(N-n-propyl-N-isopropylamino) fluoran, 2-anilino-3-methyl-6-(N-cyclohexyl-N-methylamino) fluoran, 2-anilino-3-methyl-6-(N-ethyl-p-toluidino) fluoran, 2-anilino-3-methyl-6-(N-methyl-p-toluidino) fluoran, 2-(m-trichloromethylanilino)-3-methyl-6-diethylammofluoran, 2-(m-trifluoromethylanilino)-3-methyl-6-diethylaminofluoran, 2-(m-trichloroinethylanilino)-3-methyl-6-(N-cyclohexyl-N-methylamino) fluoran, 2-(2,4-dimetliylamlino)-3-methyl-6-diethylaminofluoran, 2-(N-ethyl-p-toluidino)-3-methyl-6-(N-ethylamino) fluoran, 2-(N-ethyl-p-toluidino)-3-methyl-6-(N-propyl-p-toluidino) fluoran, 2-anilino-6-(N-n-hexy 1-N-ethylamino) fluoran, 2-(o-chloroanilino)-6-diethylaminofluoran, 2-(o-chloroanilino)-6-dibutylaminofluoran, 2-(m-trifluoromethylanilino)-6-diethylaminofluoran, 2,3-dimethyl-6-diethylaminofluoran, 3-methyl-6-(N-ethyl-p-toluidino) fluoran, 2-chloro-6-diethylaminofluoran, 2-bromo-6-diethylaminofluoran, 2-chloro-6-dipropylaminofluoran, 3-chloro-6-cyclohexylaminofluoran, 3-bromo-6-cyclohexylaminofluoran, 2-chloro-6-(N-ethyl-N-isoamylamino) fluoran, 2-chloro-3-methyl-6-diethylaminofluoran, 2-amino-3-chloro-6-diethylaminofluoran, 2-(o-chloroanilino)-3-chloro-6-cyclohexylaminofluoran, 2-(m-trifluoromethylanilino)-3-chloro-6-diethylaminofluoran, 2-(2,3-dichloroanilino)-3-chloro-6-diethylaminofluoran, 1,2-benzo-6-diethylaminofluoran, 3-diethylamino-6-(m-trifluoromethylanilino) fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-octyl-2-methylindole-3-yl)-3-(2-ethoxy-4-diethylaminophenyl)-4-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide, 3-(1-methyl-2-methylindole-3-yl)-3-(2-hexyloxy-4-diethylaminophenyl)-4-azaphthalide, 3,3-bis(2-ethoxy-4-diethylaminophenyl)-4-azaphthalide, 3,3-bis(2-ethoxy-4-diethylaminophenyl)-7-azaphthalide, 2-(p-acetylanilino)-6-(N-n-amyl-N-n-butylamino) fluoran, 2-benzylamino-6-(N-ethyl-p-toluidino) fluoran, 2-benzylamino-6-(N-methyl-2,4-dimethylanilino) fluoran, 2-benzylamino-6-(N-ethyl-2,4-dimethylamino) fluoran, 2-benzylamino-6-(N-methyl-p-toluidino) fluoran, 2-benzylamino-6-(N-ethyl-p-toluidino) fluoran, 2-(di-p-methylbenzylamino)-6-(N-ethyl-p-toluidino) fluoran, 2-(α-phenylethylamino)-6-(N-ethyl-p-toluidino) fluoran, 2-methylamino-6-(N-methylanilino) fluoran, 2-methylamino-6-(N-ethylanilino) fluoran, 2-methylamino-6-(N-propylanilino) fluoran, 2-ethylamino-6-(N-methyl-p-toluidino) fluoran, 2-methylamino-6-(N-methyl-2,4-dimethylanilino) fluoran, 2-ethylamino-6-(N-ethyl-2,4-dimethylanilino) fluoran, 2-dimethylamino-6-(N-methylanilino) fluoran, 2-dimethylamino-6-(N-ethylanilino) fluoran, 2-diethylamino-6-(N-methyl-p-toluidino) fluoran, 2-diethylamino-6-(N-ethyl-p-toluidino) fluoran, 2-dipropylamino-6-(N-methylanilino) fluoran, 2-dipropylamino-6-(N-ethylanilino) fluoran, 2-amino-6-(N-methylanilino) fluoran, 2-amino-6-(N-ethylanilino) fluoran, 2-amino-6-(N-propylanilino) fluoran, 2-amino-6-(N-methyl-p-toluidino) fluoran, 2-amino-6-(N-ethyl-p-toluidino) fluoran, 2-amino-6-(N-propyl-p-toluidino) fluoran, 2-amino-6-(N-methyl-p-ethylanilino) fluoran, 2-amino-6-(N-ethyl-p-ethylanilino) fluoran, 2-amino-6-(N-propyl-p-ethylanilino) fluoran, 2-amino-6-(N-methyl-2,4-dimethylanilino) fluoran, 2-amino-6-(N-ethyl-2,4-dimethylanilino) fluoran, 2-amino-6-(N-propyl-2,4-dimethylanilino) fluoran, 2-amino-6-(N-methyl-p-chloroanilino) fluoran, 2-amino-6-(N-ethyl-p-chloroanilino) fluoran, 2-amino-6-(N-propyl-p-chloroanilino) fluoran, 1,2-benzo-6-(N-ethyl-N-isoamylamino) fluoran, 1,2-benzo-6-dibutylaminofluoran, 1,2-benzo-6-(N-methyl-N-cyclohexylamino) fluoran, 1,2-benzo-6-(N-ethyl-N-toluidino) fluoran, and the like. For each of the recording layers 112M, 112C, and 112Y, one of the above-described coloring compounds may be used alone, or two or more types may be used in combination.

The developing/reducing agent is to develop a color of an achromatic coloring compound or decolor a coloring compound having a predetermined color, for example. Examples of the developing/reducing agent include a phenol derivative, a salicylic acid derivative, a urea derivative, and the like. Specifically, for example, the developing/reducing agent includes a compound that has a salicylic acid skeleton represented by general Formula (2) below and includes, in a molecule, a group having an electron-accepting property.

[Chem. 2]

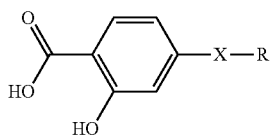

(2)

(X represents any one of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—. R represents a straight-chain hydrocarbon group having a carbon number of not less than 25 and not more than 34.)

Other than this, examples of the developing/reducing agent include 4,4'-isopropylidenebisphenol, 4,4'-isopropylidenebis(o-methylphenol), 4,4'-secondary butylidene bisphenol, 4,4'-isopropylidenebis(2-tertiary butylphenol), p-nitrobenzoic acid zinc, 1,3,5-tris(4-tert-buty-3-hydroxy-2,6-dimethylbenzyl) isocyanuric acid, 2,2-(3,4'-dihydroxy diphenyl) propane, bis(4-hydroxy-3-methylphenyl) sulfide, 4-{β-(p-methoxyphenoxy)ethoxy}salicylic acid, 1,7-bis(4-hydroxyphenylthio)-3,5-dioxaheptane, 1,5-bis(4-hydroxyphenylthio)-5-oxapentane, monobenzyl phthalate ester monocalcium salt, 4,4'-cyclohexylidenediphenol, 4,4'-isopropylidenebis(2-chlorophenol), 2,2'-methylenebis(4-methyl-6-tert-butylphenol), 4,4'-butylidenebis(6-tert-butyl-2-methyl) phenol, 1,1,3-tris(2-methyl-4-hydroxy-5-tert-butylphenyl) butane, 1,1,3-tris(2-methyl-4-hydroxy-5-cyclohexyl phenyl) butane, 4,4'-thiobis(6-tert-butyl-2-methyl) phenol, 4,4'-diphenol sulfone, 4-isopropoxy-4'-hydroxydiphenylsulfone (4-hydroxy-4'-isopropoxydiphenylsulfone), 4-benzyloxy-4'-hydroxy diphenyl sulfone, 4,4'-diphenol sulfoxide, isopropyl p-hydroxybenzoate, benzyl p-hydroxybenzoate, benzyl protocatechuate, stearyl gallate, lauryl gallate, octyl gallate, 1,3-bis (4-hydroxyphenylthio)-propane, N,N'-diphenylthiourea, N,N'-di(m-chlorophenyl)thiourea, salicylanilide, bis(4-hydroxyphenyl) acetic acid methyl ester, bis(4-hydroxyphenyl) acetic acid benzyl ester, 1,3-bis(4-hydroxycumyl) benzene, 1,4-bis(4-hydroxycumyl) benzene, 2,4'-diphenol sulfone, 2,2'-diallyl-4,4'-diphenol sulfone, 3,4-dihydroxyphenyl-4'-methyldiphenyl sulfone, zinc 1-acetyloxy-2-naphthoate, zinc 2-acetyloxy-1-naphthoate, zinc 2-acetyloxy-3-naphthoate, α,α-bis(4-hydroxyphenyl)-α-methyltoluene, antipyrine complex of zinc thiocyanate, tetrabromobisphenol A, tetrabromobisphenol S, 4,4'-thiobis(2-methylphenol), 4,4'-thiobis(2-chlorophenol), dodecylphosphonic acid, tetradecylphoshoinc acid, hexadecylphosphoinc acid, octadecylphosphonic acid, eicosylphosphonic acid, docosylphosphonic acid, tetracosylphosphonic acid, hexacosylphosphonic acid, octacosylphosphonic acid, α-hydroxydodecylphosphonic acid, α-hydroxytetradecylphosphonic acid, α-hydroxyhexadecylphosphonic acid, α-hydroxyoctadecylphosphoinc acid, α-hydroxyeicosylphosphonic acid, α-hydroxydocosylphosphonic acid, α-hydroxytetracosylphosphonic acid, dihexadecyl phosphate, dioctadecyl phosphate, dieicosyl phosphate, didocosyl phosphate, monohexadecyl phosphate, monooctadecyl phosphate, monoeicosyl phosphate, monodocosyl phosphate, methyl hexadecyl phosphate, methyl octadecyl phosphate, methyl eicosyl phosphate, methyl docosyl phosphate, amyl hexadecyl phosphate, octyl hexadecyl phosphate, lauryl hexadecyl phosphate, and the like. For each of the recording layers 112M, 112C, and 112Y, one of the above-described developing/reducing agents may be used alone or two or more types may be used in combination.

The photothermal converting agent is a substance that absorbs light of a predetermined wavelength range of, for example, a near infrared region, to generate heat. As the photothermal converting agent, for example, it is preferable to use a near-infrared absorbent dye having an absorption peak within a range of a wavelength of not less than 700 nm and not more than 2000 nm and having little absorption in a visible region. Specifically, examples of the photothermal converting agent include a compound having a cyanine skeleton (cyanine-based dye), a compound having a phtaloeyanine skeleton (phthalocyanine-based dye), a compound having a naphthalocyanine skeleton (naphthalocyanine-based dye), a compound having a squarylium skeleton (squarylium-based dye), a metal complex such as a dithio complex, diimonium salt, aminium salt, an inorganic compound, and the like. The inorganic compound includes, for example, graphite, carbon black, metal powder particles, metal oxide such as tricobalt tetroxide, iron oxide, chromium oxide, copper oxide, titanium black, or ITO, metal nitride such as niobium nitride, metal carbide such as tantalum carbide, metal sulfide, various types of magnetic powders, or the like.

It is preferable that the polymeric material be a substance in which the coloring compound, the developing/reducing agent, and the photothermal converting agent tend to disperse homogenously. Examples of the polymeric material include a thermosetting resin and a thermoplastic resin. Specifically, examples of the polymeric material include polyvinyl chloride, polyvinyl acetate, vinyl chloride-vinyl acetate copolymer, ethyl cellulose, polystyrene, styrene-based copolymer, phenoxy resin, polyester, aromatic polyester, polyurethane, polycarbonate, polyacrylic acid ester, polymethacrylic acid ester, acrylic acid copolymer, maleic acid polymer, cycloolefin copolymer, polyvinyl alcohol, modified polyvinyl alcohol, polyvinyl butyral, polyvinyl phenol, polyvinyl pyrrolidone, hydroxyethyl cellulose, carboxymethyl cellulose, starch, phenolic resin, epoxy resin, melamine resin, urea resin, unsaturated polyester resin, alkyd resin, urethane resin, polyarylate resin, polyimide, polyamide, polyamide-imide, and the like. The above-described polymeric materials may be crosslinked in use.

The recording layers 112M, 112C, and 112Y each include at least one type for each of the coloring compound, the developing/reducing agent, and the photothermal converting agent described above. In addition, for example, the recording layers 112M, 112C, and 112Y may each have a two-layer structure that includes a layer including the coloring compound and the developing/reducing agent and a layer including the photothermal converting agent. The recording layers 112M, 112C, and 112Y may each include, for example, various additives such as a sensitizer or an ultraviolet absorber other than the material described above.

The heat insulating layers 114 and 115 are provided to suppress, between the recording layer 112M and the recording layer 112C and between the recording layer 112C and the recording layer 112Y, respectively, dispersion of contained molecules or heat transfer at the time of drawing. The heat insulating layers 114 and 115 each include, for example, a general polymeric material having a light transmissivity. Examples of a specific material include polyvinyl chloride, polyvinyl acetate, vinyl chloride-vinyl acetate copolymer, ethyl cellulose, polystyrene, styrene copolymer, phenoxy resin, polyester, aromatic polyester, polyurethane, polycarbonate, polyacrylic acid ester, polymethacrylic acid ester, acrylic acid copolymer, maleic acid polymer, polyvinyl alcohol, modified polyvinyl alcohol, hydroxy ethyl cellulose, carboxymethyl cellulose, starch, and the like. It is to be noted that the heat insulating layers 114 and 115 may each include, for example, various additives such as an ultraviolet absorber. In addition, for example, the heat insulating layers 114 and 115 may each have a stacked structure including a plurality of layers with a view to, for example, improving adhesion with each of the recording layers 112M, 112C, and 112Y.

In addition, the heat insulating layers 114 and 115 may each include an inorganic material having light transmissivity. For example, use of porous silica, alumina, titania, carbon, or a complex of these, or the like reduces thermal conductivity, achieving a high heat insulation effect, and therefore is preferable. It is possible to form the heat insulating layers 114 and 115 using a sol-gel method, for example.

For example, it is preferable that the heat insulating layers 114 and 115 each have a thickness of not less than 3 and not more than 100 μm. More preferably, for example, the heat insulating layers 114 and 115 each have a thickness of not less than 5 μm and not more than 50 μm. One reason for this is that if the heat insulating layers 114 and 115 are too thin, it is not possible to obtain a sufficient heat insulating effect, and if the heat insulating layers 114 and 115 are too thick, a deterioration in thermal conductivity when heating the whole thermal recording medium 100A uniformly or a decrease in light transmissivity occurs.

The light-transmitting member 113 is provided to protect a surface of the recording layer 112 (in FIG. 3, the recording layer 112Y). Furthermore, as described above, the light-transmitting member 113 according to the present embodiment has an uneven shape in a plane of the surface (surface 113S1). The shape is not particularly limited, and in the plane, a distance from the surface (surface 113S1) of the light-transmitting member 113 to the recording layer 12 varies depending on any position in the plane. It is to be noted that the light-transmitting member 113 may have, in a rear surface (123S2) included in the light-transmitting member 113 and facing the recording layer 12, a recess that is to be included in a hollow structure between the recording layer 112 and the light-transmitting member 113.

The light-transmitting member 113 includes a material having light transmissivity, and examples of a composition material thereof include a polymeric material such as plastic, an inorganic material, and the like. Specifically, for example, the polymeric material includes acrylic resin, polycarbonate (PC), acrylonitrile butadiene-styrene resin (ABS), polyethylene telephthalate (PET), polyvinyl chloride (PVC), polypropylene (PP), polystyrene (PS), melamine resin, epoxy resin, or a copolymer thereof, or the like. The inorganic material includes, for example, silicon oxide ($SiO_x$) including glass, sapphire glass, or the like.

It is to be noted that although not illustrated, in a lower surface of the recording layer 112, for example, a layer including an adhesive, glue, or the like is provided, and the recording layer 112 is bonded onto the support substrate 111 via this layer.

(1-2. Manufacturing Method of Thermal Recording Medium)

For example, it is possible to manufacture the thermal recording medium 100A according to the present embodiment using a coating method. It is to be noted that the manufacturing method described in the following is an example of a method of directly forming, on the support substrate 111, each layer included in the thermal recording medium 100A.

First, as the support substrate 111, a white polyethylene telephthalate substrate having a thickness of 0.188 mm is prepared. Next, to 8.8 g of the solvent (methyl ethyl ketone (MEK)), 0.23 g of the leuco dye (magenta) as represented by Formula (3) below, 0.4 g of the developing/reducing agent (alkyl salicylate) as represented by Formula (2) above, 0.01 g of a phthalocyanine-based photothermal converting agent A (absorption wavelength: 915 nm), and 0.8 g of a polymeric material (poly(vinyl chloride-co-vinyl acetate (9:1))) are added, which are dispersed using a rocking mill for 2 hours to prepare a uniform dispersion (paint A). The paint A is applied on the support substrate 111 using a wire bar, and then heated and dried at 70° C. for 5 minutes, thus forming the recording layer 112M that has a thickness of 3 μm and is to turn magenta.

[Chem. 3]

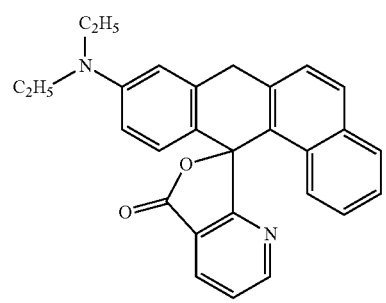

(3)

Subsequently, the heat insulating layer 114 is applied to be formed on the recording layer 112M, using a wire bar. Next, to 8.8 g of the solvent (methyl ethyl ketone (MEK)), 0.2 g of the leuco dye (cyan) as represented by Formula (4) below, 0.4 g of the developing/reducing agent (alkyl salicylate) as represented by Formula (2) above, 0.01 g of a phthalocyanine-based photothermal converting agent B (absorption wavelength: 860 nm), and 0.8 g of the polymeric material (poly(vinyl chloride-co-vinyl acetate (9:1))) are added, which are dispersed for 2 hours using a rocking mill to prepare a uniform dispersion (paint B). The paint B is applied on the heat insulating layer 114, and heated and dried at 70° C. for 5 minutes, thus forming the recording layer 112C that has a thickness of 3 μm and is to turn cyan.

[Chem. 4]

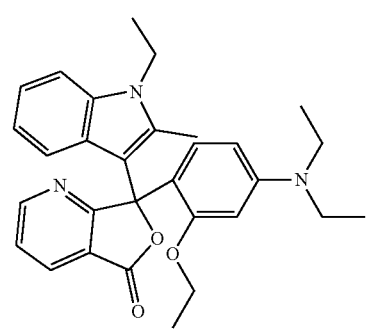

(4)

Subsequently, the heat insulating layer 115 is applied to be formed on the recording layer 112C, using a wire bar. Next, to 8.8 g of the solvent (methyl ethyl ketone (MEK)), 0.115 g of the leuco dye (yellow) as represented by Formula (5) below, 0.4 g of the developing/reducing agent (alkyl salicylate) as represented by Formula (2) above, 0.01 g of a phthalocyanine-based photothermal converting agent C (absorption wavelength: 760 nm), and 0.8 g of a polymer (poly(vinyl chloride-co-vinyl acetate (9:1))) are added, which are dispersed for 2 hours using a rocking mill to prepare a uniform dispersion (paint C). The paint C is applied on the heat insulating layer 115, and heated and dried at 70° C. for 5 minutes, thus forming the recording layer 112Y that has a thickness of 3 µm and is to turn yellow.

[Chem. 5]

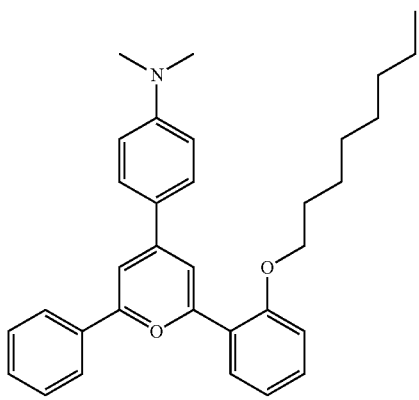

(5)

Finally, onto the recording layer 112Y, for example, the light-transmitting member 113 that is formed by in-mold molding or the like and has an uneven shape in the surface (surface 113S1) is bonded via a hot melt, an adhesive, glue, or the like, for example. As described above, the thermal recording medium 100A illustrated in FIG. 3 is completed.

It is to be noted that the recording layers 112M, 112C, and 112Y and the heat insulating layers 114 and 115 may be formed using a method other than coating as described above. For example, it is possible to form each layer using a general film forming method such as gravure coating, spray coating, spin coating, slit coating, or the like. Other than this, the method may include continuously stacking the layers as in wet-on-wet, drying each layer and then forming the next layer as in wet-on-dry, or bonding dry films as in a lamination method, and the stacking method is not particularly limited. Other than this, for example, the support substrate 111 may be immersed in a paint to form each of the recording layers 112M, 112C, and 112Y.

(1-3. Configuration of Drawing and Erasing Apparatus)

Next, the drawing and erasing apparatus 1 according to the present embodiment is described.

The drawing and erasing apparatus 1 includes, for example, a signal processing circuit 10 (control section), a laser drive circuit 20, a light source section 30, a multiplexer 40, a scanner section 50, a scanner drive circuit 60, an adjustment mechanism 70, a correction mechanism 80, and a stage 90.

For example, the signal processing circuit 10 converts (color gamut conversion) an inputted signal Din (drawing signal or erasing signal) into an image signal corresponding to the wavelength of each light source (for example, each light source 31A, 31B, and 31C that is to be described later) in the light source section 30. For example, the signal processing circuit 10 generates a projection-image clock signal synchronizing with a scanner operation of the scanner section 50. The signal processing circuit 10, for example, generates a projection image signal (projection image signal for drawing or projection image signal for erasing) to cause a laser beam to emit light in accordance with the generated image signal. The signal processing circuit 10, for example, outputs the generated projection image signal to the laser drive circuit 20. In addition, for example, the signal processing circuit 10 outputs the projection-image clock signal to the laser drive circuit 20 where necessary. Here, as described later, "where necessary" is a case of using the projection-image clock signal when synchronizing a signal source of a high-frequency signal with the image signal, etc. According to the present embodiment, the signal processing circuit 10 further determines the correction amount on the basis of a result of the calculation of the correction amount, which is fed back from a correction section 82 that is to be described later, generates a correction signal that controls the uniaxial scanner 51, and outputs the correction signal to an adjustment mechanism 83.

For example, the laser drive circuit 20 drives each light source 31A, 31B, and 31C in the light source section 30 in accordance with the projection image signal corresponding to each wavelength. For example, the laser drive circuit 20 controls luminance (brightness and darkness) of the laser beam to draw an image (image for drawing or image for erasing) corresponding to the projection image signal. For example, the laser drive circuit 20 includes a drive circuit 21A that drives the light source 31A, a drive circuit 21B that drives the light source 31B, and a drive circuit 21C that drives the light source 31C. The light sources 31A, 31B, and 31C each emit a laser beam of a near infrared range (700 nm to 2500 nm). For example, the light source 31A is a semiconductor laser that emits a laser beam La having the emission wavelength $\lambda 1$. For example, the light source 31B is a semiconductor laser that emits a laser beam Lb having the emission wavelength $\lambda 2$. For example, the light source 31C is a semiconductor laser that emits a laser beam Lc having the emission wavelength $\lambda 3$. For example, the emission wavelengths $\lambda 1$, $\lambda 2$, and $\lambda 3$ satisfy the following Formulas (1), (2), and (3), respectively.

$$\lambda a1-20 \text{ nm} < \lambda 1 < \lambda a1+20 \text{ nm} \quad (1)$$

$$\lambda a2-20 \text{ nm} < \lambda 2 < \lambda a2+20 \text{ nm} \quad (2)$$

$$\lambda a3-20 \text{ nm} < \lambda 3 < \lambda a3+20 \text{ nm} \quad (3)$$

Here, for example, $\lambda a1$ is an absorption wavelength (absorption peak wavelength) of the recording layer 112M and is, for example, 915 nm. For example, $\lambda a2$ is an absorption wavelength (absorption peak wavelength) of the recording layer 112C and is, for example, 860 nm. For example, $\lambda a3$ is an absorption wavelength (absorption peak wavelength) of the recording layer 112Y and is, for example, 760 nm. It is to be noted that "±20 nm" in Formulas (1), (2), and (3) represents an allowable error range. In a case where the emission wavelengths $\lambda 1$, $\lambda 2$, and $\lambda 3$ satisfy Formulas (1), (2), and (3), respectively, the emission wavelength $\lambda 1$ is 915 nm, for example, the emission wavelength $\lambda 2$ is 860 nm, for example, and the emission wavelength $\lambda 3$ is 760 nm, for example.

The light source section 30 includes a light source used in writing information to and erasing written information from the thermal recording medium 100. For example, the light source section 30 includes the three light sources 31A, 31B, and 31C.

For example, the multiplexer 40 includes two reflection mirrors 41a and 41d and two dichroic mirrors 41b and 41c. For example, each of the laser beams La, Lb, and Lc emitted from a corresponding one of the light sources 31A, 31B, and 31C is turned into approximately parallel light (collimated light) by a collimate lens. Subsequently, for example, the laser beam La is reflected by the reflection mirror 41a and is also reflected by the dichroic mirror 41b. The laser beam Lb is transmitted through the dichroic mirrors 41b and 41c. The laser beam Lc is reflected by the reflection mirror 41d and is also reflected by the dichroic mirror 41c. This multiplexes the laser beam La, the laser beam Lb, and the laser beam Lc. The light source section 30 further includes a lens 42 that adjusts a beam shape of multiplexed light Lm obtained through multiplexing. For example, the multiplexer 40 outputs, to the scanner section 50, the multiplexed light Lm obtained through multiplexing.

For example, the scanner section 50 performs line-sequential scanning on a surface of the thermal recording medium 100 with the multiplexed light Lm entering from the multiplexer 40. The scanner section 50 includes, for example, the uniaxial scanner 51, a uniaxial scanner 52, and an fθ lens 53. For example, the uniaxial scanner 51 is a galvanometer mirror, and corrects the entrance angle or the entrance position of the multiplexed light Lm in the light-transmitting member 113. For example, the uniaxial scanner 52 is a galvanometer mirror, and for example, a scanning direction by the uniaxial scanner 52 is a main scanning direction.

For example, the scanner drive circuit 60 drives the scanner section 50 in synchronization with the projection-image clock signal inputted from the signal processing circuit 10. In addition, for example, in a case where a signal related to an irradiation angle of the biaxial scanner 51 or the like is inputted from the scanner section 50, the scanner drive circuit 60 drives the scanner section 50 on the basis of the signal to make a desired irradiation angle.

The adjustment mechanism 70 is a mechanism provided to adjust a focus of the multiplexed light Lm. For example, the adjustment mechanism 70 is a mechanism that adjusts a position of the lens 42 by manual operation by a user. It is to be noted that the adjustment mechanism 70 may be a mechanism that adjusts the position of the lens 42 by machine operation.

The correction mechanism 80 includes, for example, a reception section 81, the correction section 82, and the adjustment mechanism 83. For example, the reception section 81 obtains information regarding the light-transmitting member 113. The correction section 82, on the basis of the information that is regarding the light-transmitting member 113 and obtained by the reception section 81, predicts an optical axis deviation, at the recording layer 112, of the multiplexed light Lm transmitted through the light-transmitting member 113, and calculates, from a result of the prediction, a correction amount necessary for obtaining a drawn image in accordance with the inputted signal Din. Furthermore, the correction section 82 calculates the entrance angle or a shift amount of the entrance position of the multiplexed light Lm with respect to the light-transmitting member 113, which is necessary for obtaining the drawn image in accordance with the inputted signal Din, and feeds back a result of the calculation to the signal processing circuit 10. The adjustment mechanism 83, on the basis of the correction signal inputted from the signal processing circuit 10, adjusts the angle of the uniaxial scanner 51, and adjusts the entrance angle and the entrance position of the multiplexed light Lm with respect to the light-transmitting member 113.

The stage 90 fixes the thermal recording medium 100 while moving the thermal recording medium 100 in a sub-scanning direction that is orthogonal to the main scanning direction.

(1-4. Drawing Method and Erasing Method)

Next, writing (drawing) and erasing of information to and from the thermal recording medium 100 are described with reference to FIG. 1.

(Writing)

First, the thermal recording medium 100 is prepared (Step S101). Next, information regarding the light-transmitting member 113 that is provided on the recording layer 112 in the thermal recording medium 100 is obtained (Step S102). Here, the information includes, for example, a surface shape and a refractive index, etc. of the light-transmitting member 113. These may be inputted from outside or may be measured by the drawing and erasing apparatus 1.

Subsequently, on the basis of the information regarding the light-transmitting member 113, an optical axis deviation of the multiplexed light Lm transmitted through the light-transmitting member 113 is predicted (Step S103). For example, this optical axis deviation of the multiplexed light Lm is predicted from an optical simulation.

Figure 4A:
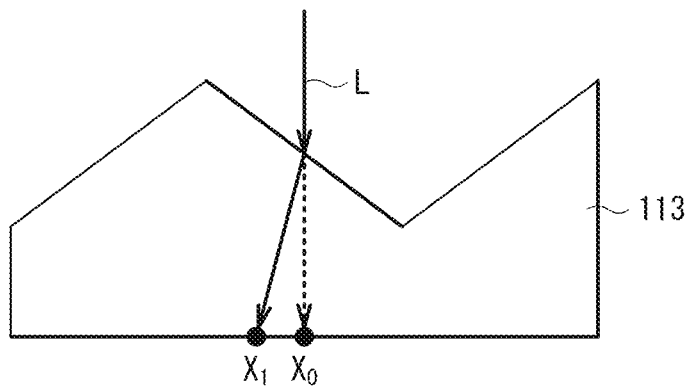
FIG. 4A describes drawing on a recording layer without correction.
Figure 4B:
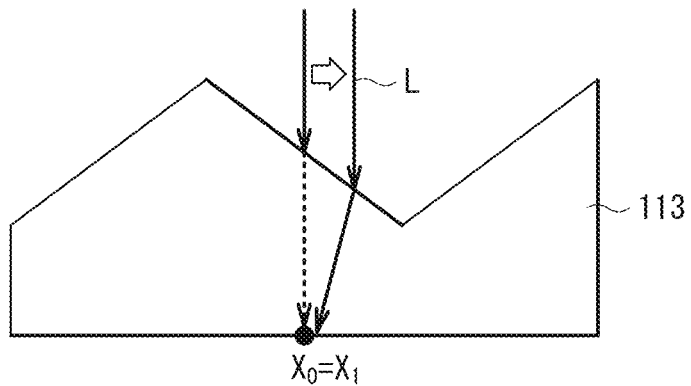
FIG. 4B describes drawing on the recording layer through correction of an entrance angle of a laser beam into a light-transmitting member.
Figure 4C:
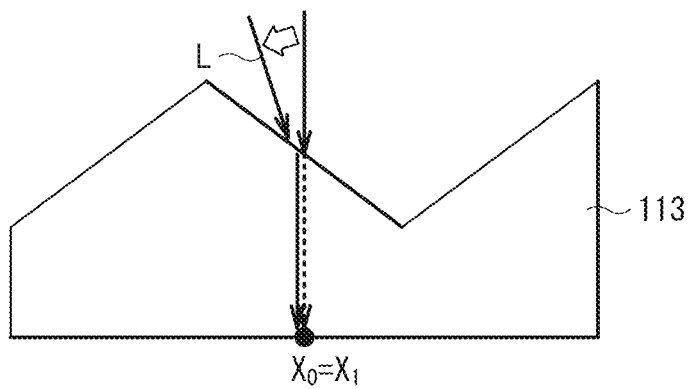
FIG. 4C describes drawing on the recording layer through correction of an entrance position of the laser beam into the light-transmitting member.

Next, from the result of the prediction of the optical axis deviation, the correction amount is calculated (Step S104). According to the present embodiment, the correction amount is a tilt of the entrance angle or a shift amount of the entrance position of the multiplexed light Lm with respect to the light-transmitting member 113. FIG. 4A illustrates a deviation amount (Δ) between a desired drawing position (X0) and an actual drawing position (X1) when performing drawing on the recording layer provided with the light-transmitting member having a flat surface, that is, emitting the laser beam L without correction. According to the present embodiment, this deviation amount (Δ) is predicted in Step S103, to calculate, in Step S104, on the basis of the result of the prediction, the tilt of the entrance angle of the laser beam L with respect to the light-transmitting member 113 (FIG. 4B) or the shift amount of the entrance position of the laser beam L into the light-transmitting member 113 (FIG. 4C), which are necessary for drawing on the desired drawing position (X0).

Subsequently, for example, the result of the calculation is fed back to the signal processing circuit 10 (Step S105). Tire signal processing circuit 10 determines the correction amount on the basis of the result of the calculation (Step S106) and starts drawing on the thermal recording medium 100 (Step S107).

Drawing on the thermal recording medium 100 is performed as follows. First, the thermal recording medium 100 is set to the stage 90. Next, on the basis of an input image signal (drawing signal D1in), the signal processing circuit 10 selects a light source that is to be driven. The signal processing circuit 10 generates a projection image signal to drive the light source selected on the basis of the drawing signal D1in. The signal processing circuit 10 outputs the generated projection image signal to the laser drive circuit 20, to control the light source section 30. This causes, for example, the thermal recording medium 100 to be irradiated, from a set of the drawing and erasing apparatus 1, with multiplexed light Lm1 that is obtained as a result of appropriately multiplexing the laser beam La having an emission wavelength of 915 nm, the laser beam Lb of 860 nm, and the laser beam Lc of 760 nm.

As a result, for example, the laser beam La having the emission wavelength of 915 nm is absorbed by the photothermal converting agent in the recording layer 112M, and the heat generated by the photothermal converting agent causes the leuco dye in the recording layer 112M to reach a writing temperature and combine with the developing/reducing agent, to turn magenta. The color optical density of magenta depends on the intensity of the laser beam having the emission wavelength of 915 nm. In addition, the laser beam having the emission wavelength of 860 nm is absorbed by the photothermal converting agent in the recording layer 112C, and thereby the heat generated from the photothermal converting agent causes the leuco dye in the recording layer 112C to reach the writing temperature and combine with the developing/reducing agent, to turn cyan. The color optical density of cyan depends on the intensity of the laser beam having the emission wavelength of 860 nm. In addition, the laser beam having the emission wavelength of 760 nm is absorbed by the photothermal converting agent in the recording layer 112Y, and thereby the heat generated from the photothermal converting agent causes the leuco dye in the recording layer 112Y to reach the writing temperature and combine with the developing/reducing agent, to turn yellow. The color optical density of yellow depends on the intensity of the laser beam having the emission wavelength of 760 nm. As a result, a mixture of magenta, cyan, and yellow develops into a desired color. In this manner, information is written to the thermal recording medium 100.

According to the present embodiment, tire scanner section 50 includes two uniaxial scanners (uniaxial scanners 51 and 52), to adjust, using one of the scanners as an optical axis correction mirror for the multiplexed light Lm entering from the multiplexer 40, the entrance angle, the entrance position, or both of the multiplexed light Lm with respect to the light-transmitting member 113 on the basis of the correction signal outputted from the signal processing circuit 10 to the adjustment mechanism 83. This causes writing to be performed on the recording layer 112 in accordance with the input image signal.

(Erasing)

The procedure of the drawing method illustrated in FIG. 1 is also applicable to erasing of information that is written on the thermal recording medium 100. First, the thermal recording medium 100 on which information is written as described above is prepared (Step S101), and set to the drawing and erasing apparatus 1. Then, as in writing, the information regarding the light-transmitting member 113 provided on the recording layer 112 in the thermal recording medium 100 is obtained (Step S102), and after predicting the optical axis deviation (Step S103), calculating the correction amount (Step S104), feeding back the result of the calculation to the signal processing circuit 10 (Step S105), and determining the correction amount (Step S106), an erasing operation is started as follows.

The light source section 30 is controlled to irradiate, with a laser beam, the thermal recording medium 100 set to the drawing and erasing apparatus 1. At this time, when irradiating the thermal recording medium 100 with the laser beam, the signal processing circuit 10 uses the laser beam La having the emission wavelength $\lambda 1$, the laser beam Lb having the emission wavelength $\lambda 2$, and the laser beam Lc having the emission wavelength $\lambda 3$.

Here, it is assumed that the wavelengths $\lambda 1$, $\lambda 2$, and $\lambda 3$ satisfy Formulas (1), (2), and (3) above, respectively. In this case, for example, the laser beam La having the emission wavelength $\lambda 1$ (for example, 915 nm) is absorbed by the photothermal converting agent in the recording layer 112M. In addition, for example, the laser beam Lb having the emission wavelength $\lambda 2$ (for example, 860 nm) is absorbed by the photothermal converting agent in the recording layer 112C. In addition, for example, the laser beam Lc having the emission wavelength $\lambda 3$ (for example, 760 nm) is absorbed by the photothermal converting agent in the recording layer 113Y. Consequently, the heat generated from the photothermal converting agent in each of the recording layers 112M, 112C, and 112Y causes the leuco dye in each recording layer 112 to reach an erasing temperature and separate from the developing/reducing agent to be decolored. In this manner, the drawing and erasing apparatus 1 erases information written (drawn image) on the thermal recording medium 100.

At this time, the scanner section 50 includes two uniaxial scanners (uniaxial scanners 51 and 52), to adjust, using one of the scanners as an optical axis correction mirror for the multiplexed light Lm entering from the multiplexer 40, the entrance angle, the entrance position, or both of the multiplexed light Lm with respect to the light-transmitting member 113 on the basis of the correction signal outputted from the signal processing circuit 10 to the adjustment mechanism 83. This causes erasing to be performed on the recording layer 112 in accordance with the input image signal.

(1-5. Workings and Effects)

As described earlier, unlike a contact-type recording method using a thermal head, for example, the thermal recording technique using a laser allows noncontact recording, thus making it possible to perform drawing even if the thermal recording layer is not included in the outermost surface. For example, this makes it possible to perform drawing through thick glass, and this is expected to be applicable to information recording or a decorating technique, etc. that are yet to be achieved.

Meanwhile, in an upper portion of the thermal recording medium, a structure having light transmissivity is provided in a surface decoration. However, in use for decoration, the structure (surface decoration member) having light transmissivity and provided in the surface decoration does not necessarily have a uniform thickness, and for example, a case where the structure has a geometrical cross-sectional shape is assumed. In such a case, a refraction of the laser beam or variation in beam diameter, etc. occur at a surface of the surface decoration member and prevent a transfer of intended image information to the thermal recording medium on a one-to-one basis as two-dimensional coordinates, which is likely to cause a distortion of a drawn image or drawing unevenness, and result in a deterioration in display quality.

Figure 5:
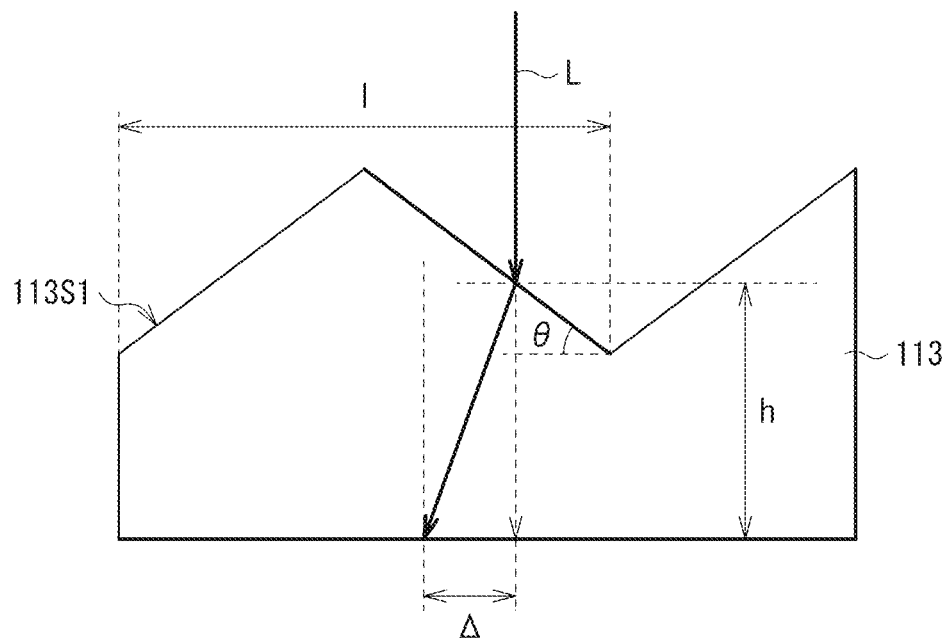
FIG. 5 describes a refraction of a laser beam in an uneven surface.

As an example, as in the present embodiment, when causing the laser beam L to directly enter the light-transmitting member 113 having an uneven shape in the surface, at an inclined surface included in the uneven shape, the laser beam L is refracted at the surface of the light-transmitting member 113, which results in an axis deviation by A from am assumed drawing position as illustrated in FIG. 5, for example. Alternatively, a lens effect of the light-transmitting member 113 causes variation in the spot diameter of the laser beam L, which results in variation in power density. The axis deviation of the laser beam L leads to a distortion in the drawn image, and the variation in power density leads to drawing unevenness, which is likely to prevent homogenous drawing.

Figure 6:
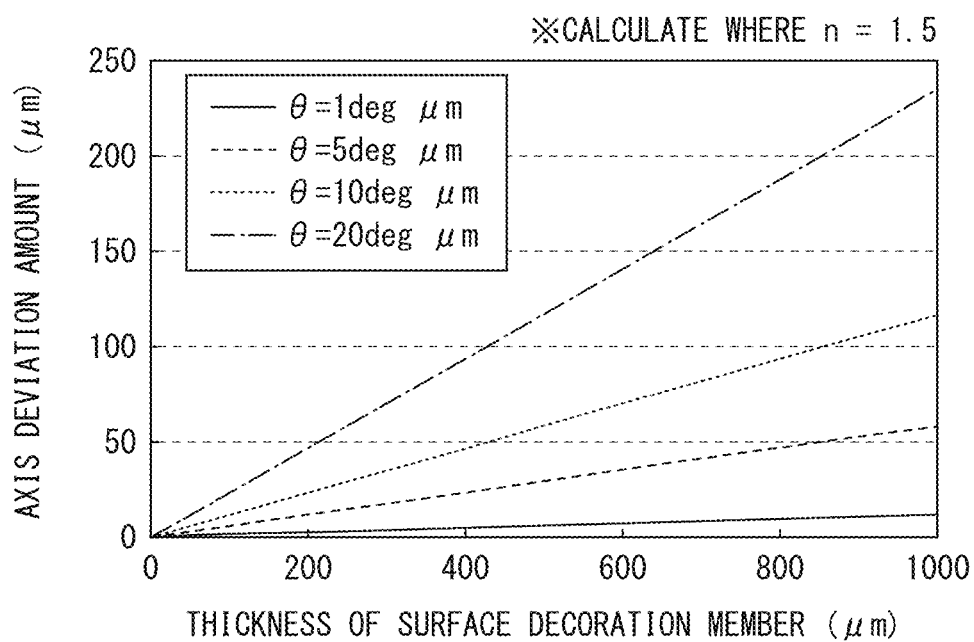
FIG. 6 is a characteristic diagram that illustrates a relationship between a thickness of a surface decoration member and an axis deviation amount of the laser beam.

FIG. 6 illustrates a relationship between the thickness of the surface decoration member and the axis deviation amount of the laser beam. For example, for the axis deviation amount in the surface decoration member having the inclined surface as illustrated in FIG. 5, although the axis deviation amount depends on a thickness h and a tilt angle $\theta$ of the member at an entrance position of the laser beam, there is a case where an axis deviation of not less than several hundred μm occurs in a case where n=1.5, for example. In this case, this results in a clearly visible distortion in the drawn image, and deteriorates merchantability.

Figure 7:
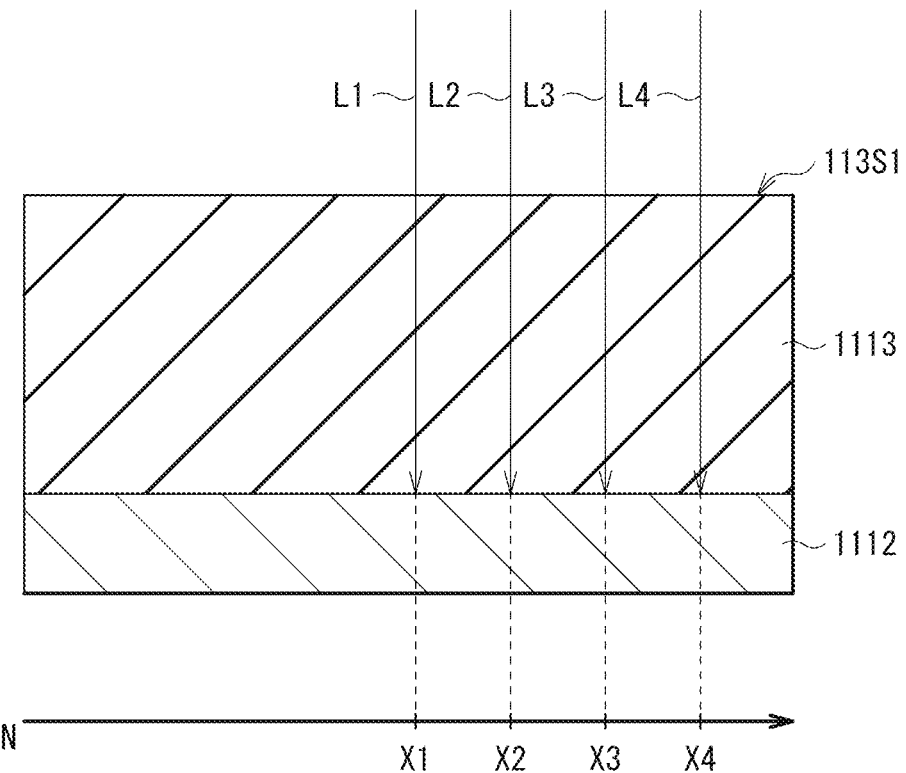
FIG. 7 illustrates a drawing position when irradiating, with a laser beam, a general thermal recording medium having, in a surface, a surface decoration member having a flat surface.
Figure 8:
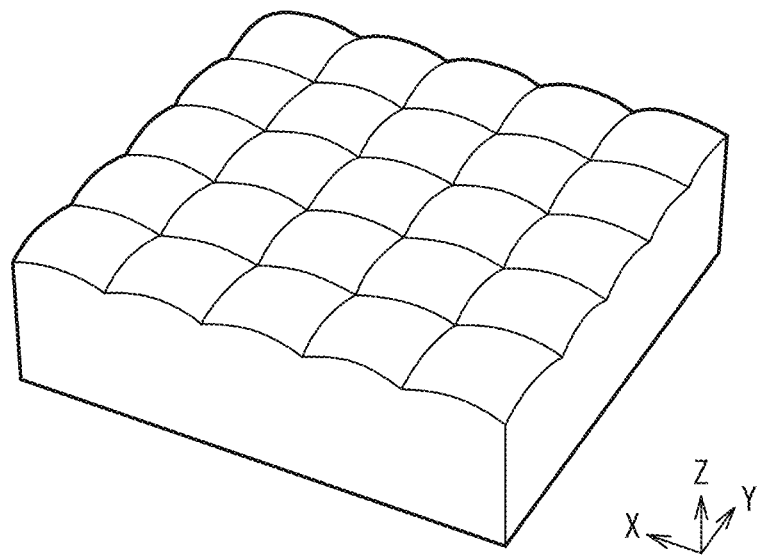
FIG. 8 is a schematic diagram of a microlens array.
Figure 9:
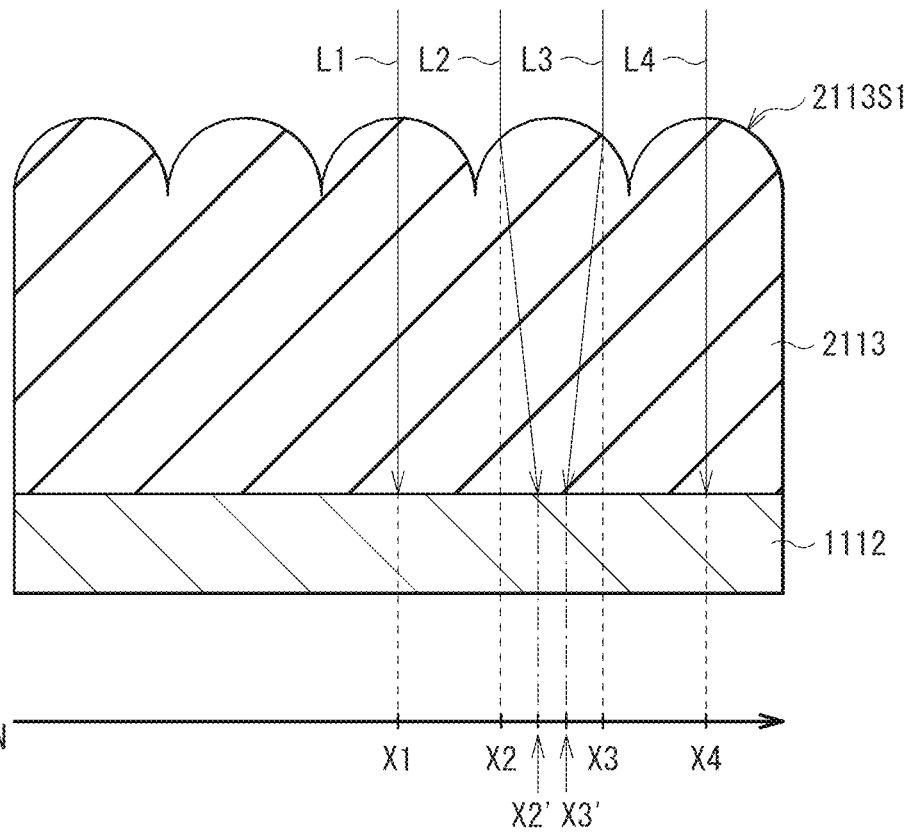
FIG. 9 illustrates a drawing position when irradiating, with a laser beam, a thermal recording medium having, in a surface, a surface decoration member having unevenness in a surface.

FIGS. 7 to 12 each describe an influence of the surface shape of the surface decoration member on the drawn image in more detail. For example, as illustrated in FIG. 7, when irradiating a surface decoration member 1113 having a flat surface with laser beams L1, L2, L3, and L4 at a predetermined pitch, drawing is performed on a recording layer 1112 in accordance with the pitch between each of the laser beams L1, L2, L3, and L4 (drawing positions X1, X2, X3, and X4). In contrast, when irradiating, with the laser beams L1, L2, L3, and L4, a microlens array (surface decoration member 2113) as illustrated in FIG. 8, the drawing position on the recording layer 1112 fluctuates depending on the surface shape of the microlens array at the entrance position of each of the laser beams L1, L2, L3, and L4 (drawing positions X1, X2', X3', and X4).

Figure 10:
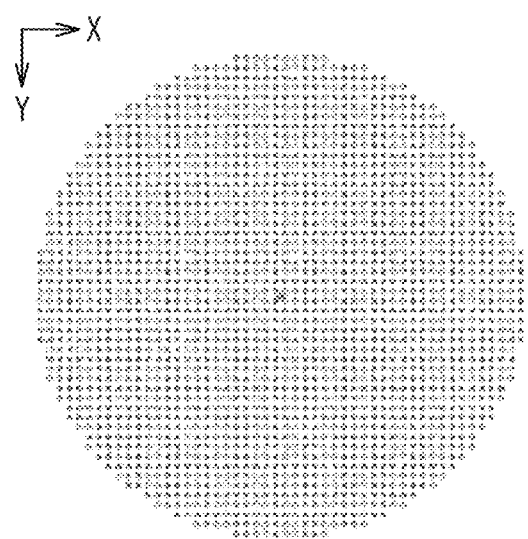
FIG. 10 illustrates a spot position when irradiating, with a beam, a glass substrate having a flat surface.
Figure 11:
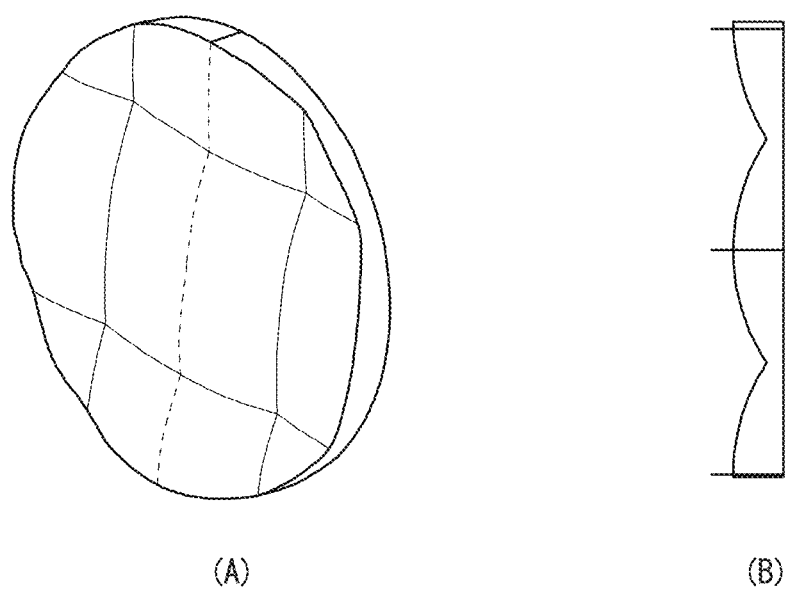
FIG. 11 is a perspective view (A) and a cross-sectional schematic diagram (B) that illustrate a configuration of a microlens.
Figure 12:
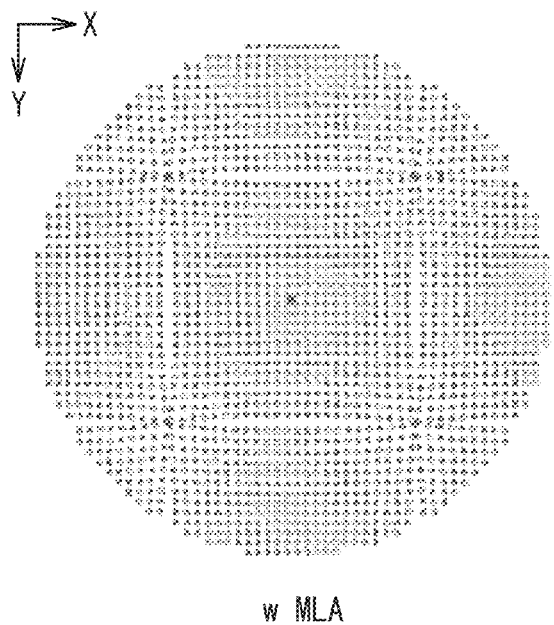
FIG. 12 illustrates a spot position in a case of irradiating, with a beam, the microlens illustrated in FIG. 11.

In addition, for example, in a ease of irradiating, with a beam, a glass substrate having a flat surface as illustrated in FIG. 7 at a pitch of 400 μm along both X and Y, spot positions thereof are evenly laid out as illustrated in FIG. 10. On the other hand, as illustrated in (A) and (B) of FIG. 11, for example, in a case of irradiating, with the above beam, a microlens array having, as a microlens array parameter (MLA parameter), a parallel array pitch ($P_P$): 10 mm, a vertical array pitch ($P_V$): 10 mm, a lens center thickness ($T_C$): 2 mm, a lens curvature radius (R): 10 mm (convex shape), and an MLA refractive index (n): 1.452322, the spot positions thereof are unevenly laid out as illustrated in FIG. 12. It is to be noted that (B) of FIG. 11 illustrates a cross section along a dotted line illustrated in (A) of FIG. 11.

In contrast, in the drawing method and the erasing method performed on the thermal recording medium 100 according to the present embodiment, information regarding the light-transmitting member 113 is obtained, to predict the optical axis deviation of the laser beam on the recording layer 112 from the information regarding the light-transmitting member 113, and calculate the correction amount from the result of the prediction of the optical axis deviation of the laser beam, to subsequently perform drawing on the recording layer 112 or erasing of an image drawn on the recording layer 112. Specifically, the scanner section 50 additionally includes the uniaxial scanner 51 as an optical member for correction, to adjust the entrance angle and the entrance position of the multiplexed light Lm with respect to the light-transmitting member 113 on the basis of the correction signal outputted from the signal processing circuit 10 to the adjustment mechanism 83.

As described above, in the drawing method and the erasing method performed on the thermal recording medium 100 according to the present embodiment, the correction amount with which to correct the optical axis deviation of the laser beam L due to the light-transmitting member 113 is previously determined, to subsequently start drawing on the thermal recording medium 100. Then, for example, the uniaxial scanner 51 is caused to adjust the entrance angle and the entrance position of the multiplexed light Lm with respect to the light-transmitting member 113. This causes writing to be performed on the thermal recording medium 100 in accordance with a signal Gin that is inputted. In other words, this makes it possible to perform drawing on the recording layer 112 without distortion, thus making it possible to improve display quality.

Next, second and third embodiments of the present disclosure are described. In the following, the same reference numerals are assigned to components similar to those in the above first embodiment, and descriptions thereof are omitted as appropriate.

2. SECOND EMBODIMENTS

Figure 13:
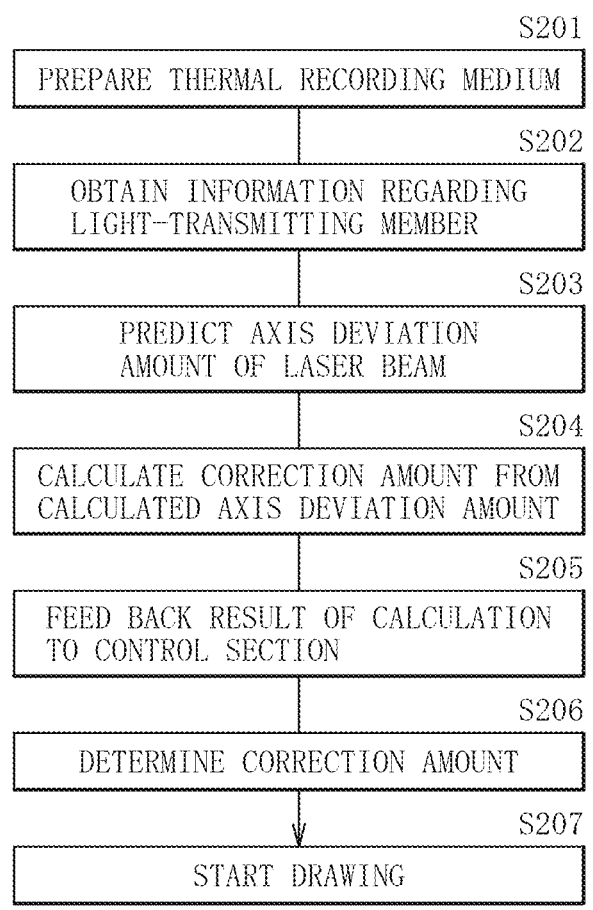
FIG. 13 illustrates a procedure of the drawing method performed on the thermal recording medium according to a second embodiment of the present disclosure.
Figure 14:
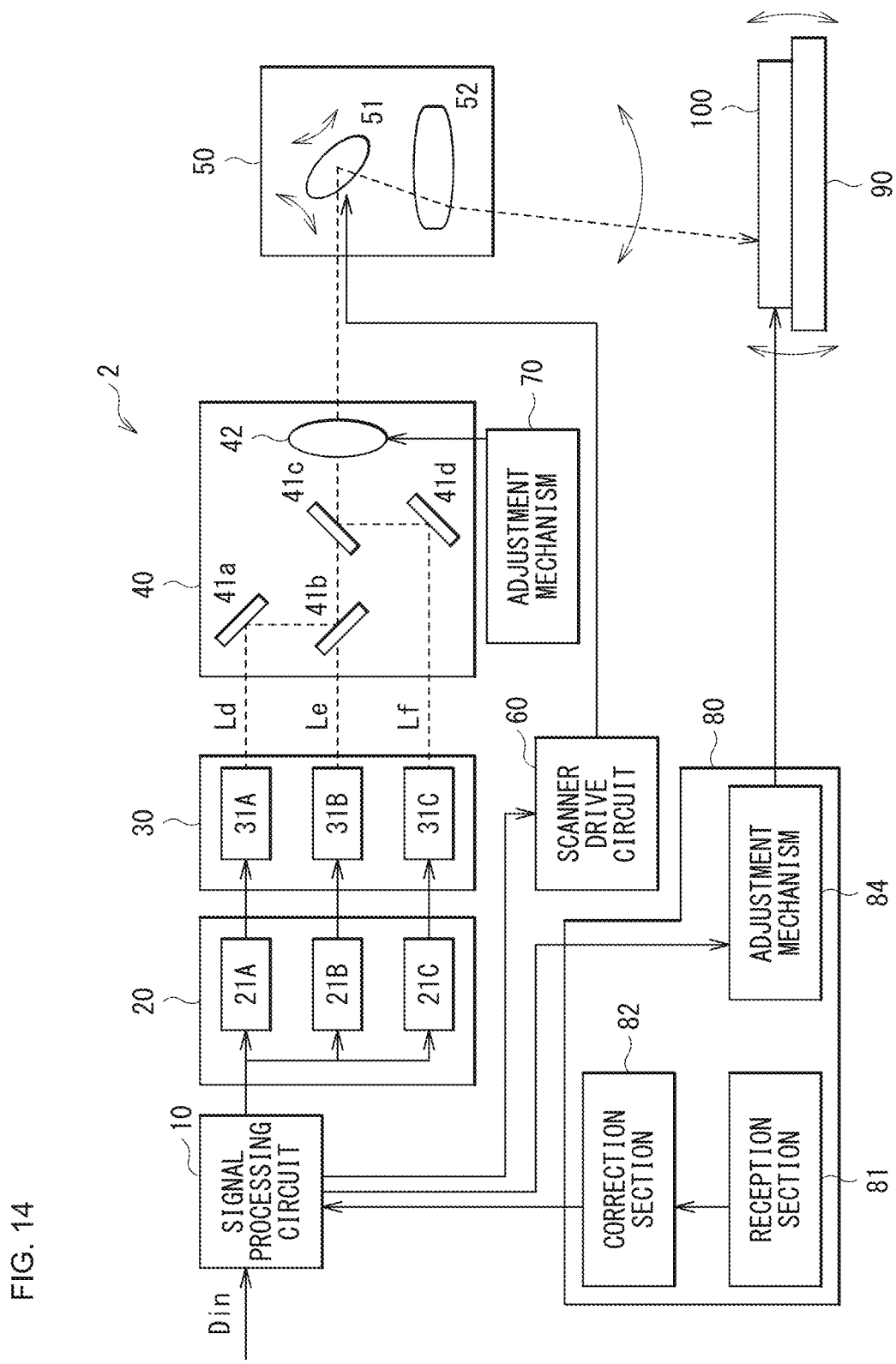
FIG. 14 illustrates an example of a system configuration of a drawing and erasing apparatus according to the second embodiment of the present disclosure.

FIG. 13 illustrates a procedure of the drawing method performed on a thermal recording medium (thermal recording medium 100) according to a second embodiment of the present disclosure. FIG. 14 illustrates an example of a system configuration of a drawing and erasing apparatus (drawing and erasing apparatus 2) according to the second embodiment of the present disclosure. In the drawing method and the erasing method according to the present embodiment, information regarding the light-transmitting member 113 is obtained, to predict the optical axis deviation of the laser beam L on the recording layer 112 from the information regarding the light-transmitting member 113, and calculate tire correction amount from the result of the prediction of the optical axis deviation of the laser beam L, to subsequently perform drawing on the recording layer 112 or erasing of an image drawn on the recording layer 112. According to the present embodiment, a pedestal section (stage 90) that fixes the thermal recording medium 100 is moved to correct the entrance angle or the entrance position of the laser beam L with respect to the light-transmitting member 113 in the thermal recording medium 100. This, for example, makes it possible to perform homogenous drawing on the recording layer 112.

(2-1. Configuration of Drawing and Erasing Apparatus)

The drawing and erasing apparatus 2 includes, for example, the signal processing circuit 10 (control section), the laser drive circuit 20, the light source section 30, the multiplexer 40, the scanner section 50, the scanner drive circuit 60, the adjustment mechanism 70, the correction mechanism 80, and the stage 90.

For example, the signal processing circuit 10 converts (color gamut conversion) an inputted signal Din (drawing signal or erasing signal) into an image signal corresponding to the wavelength of each light source (for example, each light source 31A, 31B, and 31C that is to be described later) in the light source section 30. For example, the signal processing circuit 10 generates a projection-image clock signal synchronizing with a scanner operation of the scanner section 50. The signal processing circuit 10, for example, generates a projection image signal (projection image signal for drawing or projection image signal for erasing) to cause a laser beam to emit light in accordance with the generated image signal. The signal processing circuit 10, for example, outputs the generated projection image signal to the laser drive circuit 20. In addition, for example, the signal processing circuit 10 outputs the projection-image clock signal to the laser drive circuit 20 where necessary. Here, as described later, "where necessary" is a case of using the projection-image clock signal when synchronizing a signal source of a high-frequency signal with the image signal, etc. In the present embodiment, the signal processing circuit 10 further determines the correction amount on the basis of the result of the calculation of the correction amount, which is fed back from the correction section 82 that is to be described later, generates a correction signal that controls the movement of the stage 90, and outputs the correction signal to an adjustment mechanism 84.

For example, the laser drive circuit 20 drives each light source 31A, 31B, and 31C in the light source section 30 in accordance with the projection image signal corresponding to each wavelength. For example, the laser drive circuit 20 controls luminance (brightness and darkness) of the laser beam to draw an image (image for drawing or image for erasing) corresponding to the projection image signal. For example, the laser drive circuit 20 includes the drive circuit 21A that drives the light source 31A, the drive circuit 21B that drives the light source 31B, and the drive circuit 21C that drives the light source 31C. The light sources 31A, 31B, and 31C each emit a laser beam of a near infrared range (700 nm to 2500 nm). For example, the light source 31A is a semiconductor laser that emits the laser beam La having the emission wavelength λ1. For example, the light source 31B is a semiconductor laser that emits the laser beam Lb having the emission wavelength λ2. For example, the light source 31C is a semiconductor laser that emits the laser beam Lc having the emission wavelength λ3. For example, the emission wavelengths λ1, λ2, and λ3 satisfy the following Formulas (1), (2), and (3), respectively.

$$\lambda a1-20 \text{ nm} < \lambda 1 < \lambda a1+20 \text{ nm} \tag{1}$$

$$\lambda a2-20 \text{ nm} < \lambda 2 < \lambda a2+20 \text{ nm} \tag{2}$$

$$\lambda a3-20 \text{ nm} < \lambda 3 < \lambda a3+20 \text{ nm} \tag{3}$$

Here, for example, Lai is an absorption wavelength (absorption peak wavelength) of the recording layer 112M and is, for example, 915 nm. For example, λa2 is an absorption wavelength (absorption peak wavelength) of the recording layer 112C and is, for example, 860 nm. For example, λa3 is an absorption wavelength (absorption peak wavelength) of the recording layer 112Y and is, for example, 760 nm. It is to be noted that "±20 nm" in Formulas (1), (2), and (3) represents an allowable error range. In a case where the emission wavelengths λ1, λ2, and λ3 satisfy Formulas (1), (2), and (3), respectively, the emission wavelength λ1 is 915 nm, for example, the emission wavelength λ2 is 860 nm, for example, and the emission wavelength λ3 is 760 nm, for example.

The light source section 30 includes a light source used in writing information to and erasing written information from the thermal recording medium 100. For example, the light source section 30 includes the three light sources 31A, 31B, and 31C.

For example, the multiplexer 40 includes two reflection mirrors 41a and 41d and two dichroic mirrors 41b and 41c. For example, each of the laser beams La, Lb, and Lc emitted from a corresponding one of the light sources 31A, 31B, and 31C is turned into approximately parallel light (collimated light) by a collimate lens. Subsequently, for example, the laser beam La is reflected by the reflection mirror 41a and is also reflected by the dichroic mirror 41b. The laser beam Lb is transmitted through the dichroic mirrors 41b and 41c. The laser beam Lc is reflected by the reflection mirror 41d and is also reflected by the dichroic mirror 41c. This multiplexes the laser beam La, the laser beam Lb, and the laser beam Lc. The light source section 30 further includes the lens 42 that adjusts a beam shape of multiplexed light Lm obtained through multiplexing. For example, the multiplexer 40 outputs, to the scanner section 50, the multiplexed light Lm obtained through multiplexing.

For example, the scanner section 50 performs line-sequential scanning on a surface of the thermal recording medium 100 with the multiplexed light Lm entering from the multiplexer 40. The scanner section 50 includes, for example, the uniaxial scanner 52 and the fθ lens 53. For example, the uniaxial scanner 52 is a galvanometer mirror, and for example, the scanning direction by the uniaxial scanner 52 is the main scanning direction.

For example, the scanner drive circuit 60 drives the scanner section 50 in synchronization with the projection-image clock signal inputted from the signal processing circuit 10. In addition, for example, in a case where the signal related to the irradiation angle of the biaxial scanner 51 or the like is inputted from the scanner section 50, the scanner drive circuit 60 drives the scanner section 50 on the basis of the signal to make a desired irradiation angle.

The adjustment mechanism 70 is a mechanism provided to adjust a focus of the multiplexed light Lm. For example, the adjustment mechanism 70 is a mechanism that adjusts a position of the lens 42 by manual operation by a user. It is to be noted that the adjustment mechanism 70 may be a mechanism that adjusts the position of the lens 42 by machine operation.

The correction mechanism 80 includes, for example, the reception section 81, the correction section 82, and the adjustment mechanism 83. For example, the reception section 81 obtains information regarding the light-transmitting member 113. The correction section 82, on the basis of the information that is regarding the light-transmitting member 113 and obtained by the reception section 81, predicts the optical axis deviation, on the recording layer 112, of the multiplexed light Lm transmitted through the light-transmitting member 113, and calculates, from the result of the prediction, the correction amount necessary for obtaining a drawn image in accordance with the inputted signal Din. Furthermore, the correction section 82 calculates the entrance angle or the shift amount of the entrance position of the multiplexed light Lm with respect to the light-transmitting member 113, which is necessary for obtaining the drawn image in accordance with the inputted signal Din, and feeds back the result of the calculation to the signal processing circuit 10. The adjustment mechanism 84, on the basis of the correction signal inputted from the signal processing circuit 10, adjusts a position and a tilt of the stage 90, to adjust the entrance angle and the entrance position of the multiplexed light Lm with respect to the light-transmitting member 113.

The stage 90 fixes the thermal recording medium 100 while moving the thermal recording medium 100 in the sub-scanning direction that is orthogonal to tire main scanning direction. In addition, in the present embodiment, the stage 90 is to adjust the tilt of the thermal recording medium 100.

(2-2. Drawing Method and Erasing Method)

Next, writing (drawing) and erasing of information to and from the thermal recording medium 100 are described with reference to FIG. 13.

(Writing)

First, the thermal recording medium 100 is prepared (Step S20.1). Next, information regarding the light-transmitting member 113 that is provided on the recording layer 112 in the thermal recording medium 100 is obtained (Step S202). Here, the information includes, for example, the surface shape and the refractive index, etc. of the light-transmitting member 113. These may be inputted from outside or may be measured by the drawing and erasing apparatus 1.

Subsequently, on the basis of the information regarding the light-transmitting member 113, the optical axis deviation of the multiplexed tight Lm transmitted through the light-transmitting member 113 is predicted (Step S203). For example, this optical axis deviation of the multiplexed light Lm is predicted from an optical simulation.

Next, from the result of the prediction of the optical axis deviation, the correction amount is calculated (Step S204). According to the present embodiment, the correction amount is the tilt of the entrance angle or the shift amount of the entrance position of the multiplexed light Lm with respect to the light-transmitting member 113.

Subsequently, for example, the result of the calculation is fed back to the signal processing circuit 10 (Step S205). The signal processing circuit 10 determines the correction amount on the basis of the result of the calculation (Step S206) and starts drawing on the thermal recording medium 100 (Step S207).

Drawing on the thermal recording medium 100 is performed as follows. First, the thermal recording medium 100 is set to the stage 90. Next, on the basis of the input image signal (drawing signal Dim), the signal processing circuit 10 selects the light source that is to be driven. The signal processing circuit 10 generates the projection image signal to drive the light source selected on the basis of the drawing signal D1in. The signal processing circuit 10 outputs the generated projection image signal to the laser drive circuit 20, to control the light source section 30. This causes, for example, the thermal recording medium 100 to be irradiated, from the set of the drawing and erasing apparatus 1, with the multiplexed light Lm1 obtained as a result of appropriately multiplexing the laser beam La having an emission wavelength of 915 nm, the laser beam Lb of 860 nm, and the laser beam Lc of 760 nm.

As a result, for example, the laser beam La having the emission wavelength of 915 nm is absorbed by the photothermal converting agent in the recording layer 112M, and the heat generated by the photothermal converting agent causes the leuco dye in the recording layer 112M to reach a writing temperature and combine with the developing/reducing agent, to turn magenta. The color optical density of magenta depends on the intensity of the laser beam having the emission wavelength of 915 nm. In addition, the laser beam having the emission wavelength of 860 nm is absorbed by the photothermal converting agent in the recording layer 112C, and thereby the heat generated from the photothermal converting agent causes the leuco dye in the recording layer 112C to reach the writing temperature and combine with the developing/reducing agent, to turn cyan. The color optical density of cyan depends on the intensity of the laser beam having the emission wavelength of 860 nm. In addition, the laser beam having the emission wavelength of 760 nm is absorbed by the photothermal converting agent in the recording layer 112Y, and thereby the heat generated from the photothermal converting agent causes the leuco dye in the recording layer 112Y to reach the writing temperature and combine with the developing/reducing agent, to turn yellow. The color optical density of yellow depends on the intensity of the laser beam having the emission wavelength of 760 nm. As a result, a mixture of magenta, cyan, and yellow develops into a desired color. In this manner, information is written to the thermal recording medium 100.

Figure 15A:
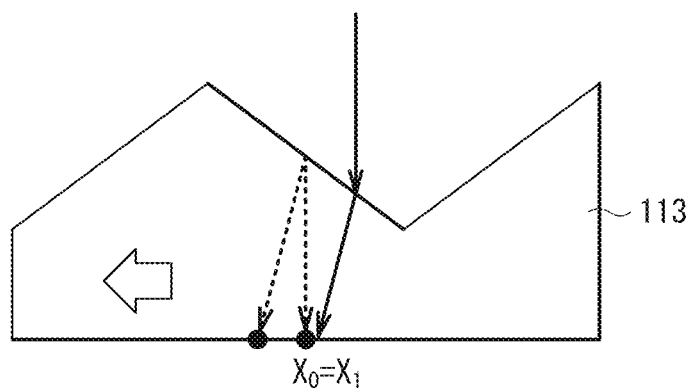
FIG. 15A describes drawing on a recording layer in which the entrance position of the laser beam into the light-transmitting member is corrected by moving a stage.
Figure 15B:
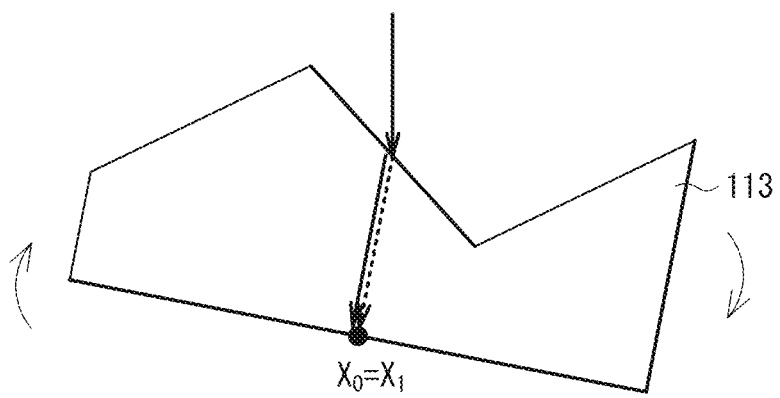
FIG. 15B describes drawing on the recording layer in which the entrance angle of the laser beam into the light-transmitting member is corrected by tilting the stage.

According to the present embodiment, other than moving the stage 90 in a planar direction (sub-scanning direction), for example, the stage 90 is caused to be rotatable within a range of ±90° to cause the adjustment mechanism 84 to control the movement of the stage 90. Accordingly, as illustrated in FIG. 15A, for example, moving the stage 90 in an X-axis direction, for example, makes it possible to adjust the entrance position of the laser beam L into the light-transmitting member 113. In addition, as illustrated in FIG. 15B, for example, rotating the stage 90 makes it possible to adjust the entrance angle of the laser beam L with respect to the light-transmitting member 113. This causes writing to be performed on the recording layer 112 in accordance with the input image signal.

(Erasing)

The procedure of the drawing method illustrated in FIG. 13 is also applied to erasing of information written on the thermal recording medium 100. First, the thermal recording medium 100 on which information is written as described above is prepared (Step S201), and set to the drawing and erasing apparatus 2. Then, as in writing, information regarding the light-transmitting member 113 that is provided on the recording layer 112 in the thermal recording medium 100 is obtained (Step S202), and after predicting the optical axis deviation (Step S203), calculating the correction amount (Step S204), feeding back the result of the calculation to the signal processing circuit 10 (Step S205), and determining the correction amount (Step S206), the erasing operation is started as follows.

The light source section 30 is controlled to irradiate, with a laser beam, the thermal recording medium 100 set to the drawing and erasing apparatus 1. At this time, when irradiating the thermal recording medium 100 with the laser beam, the signal processing circuit 10 uses the laser beam La having the emission wavelength $\lambda 1$, the laser beam Lb having the emission wavelength $\lambda 2$, and the laser beam Lc having the emission wavelength $\lambda 3$.

Here, it is assumed that the wavelengths $\lambda 1$, $\lambda 2$, and $\lambda 3$ satisfy Formulas (1), (2), and (3) above, respectively. In this case, for example, the laser beam La having the emission wavelength $\lambda 1$ (for example, 915 nm) is absorbed by the photothermal converting agent in the recording layer 112M. In addition, for example, the laser beam Lb having the emission wavelength $\lambda 2$ (for example, 860 nm) is absorbed by the photothermal converting agent in the recording layer 112C. In addition, for example, the laser beam Lc having the emission wavelength $\lambda 3$ (for example, 760 nm) is absorbed by the photothermal converting agent in the recording layer 113Y. Consequently, the heat generated from the photothermal converting agent in each of the recording layers 112M, 112C, and 112Y causes the leuco dye in each recording layer 112 to reach an erasing temperature and separate from the developing/reducing agent to be decolored. In this manner, the drawing and erasing apparatus 1 erases information written (drawn image) on the thermal recording medium 100.

At this time, as in writing, other than moving the stage 90 in the planar direction (sub-scanning direction), for example, the stage 90 is caused to be rotatable within a range of ±90° to cause the adjustment mechanism 84 to control the movement of the stage 90. This makes it possible to perform erasing on the recording layer 112 in accordance with the input image signal.

(2-3. Workings and Effects)

As described above, in the drawing method and the erasing method performed on the thermal recording medium 100 according to the present embodiment, the correction amount with which to correct the optical axis deviation of the laser beam L due to the light-transmitting member 113 is previously determined, to subsequently start drawing on the thermal recording medium 100. Then, for example, the stage 90 that fixes the thermal recording medium 100 is moved to thereby adjust the entrance angle and the entrance position of the multiplexed light Lm with respect to the light-transmitting member 113. This causes writing to be performed on the thermal recording medium 100 in accordance with the signal Gin that is inputted. In other words, this makes it possible to perform drawing on the recording layer 112 without distortion, thus making it possible to improve display quality.

3. THIRD EMBODIMENTS

Figure 16:
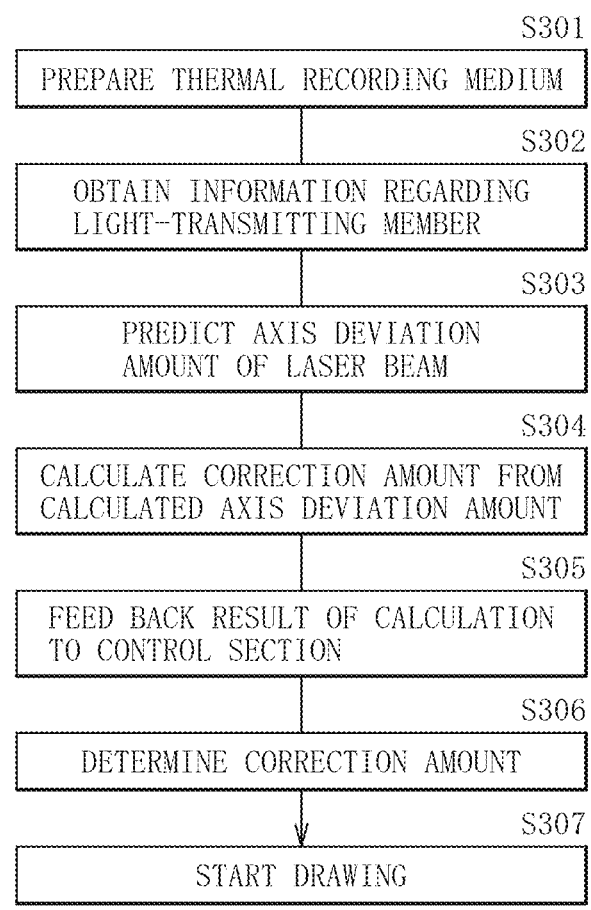
FIG. 16 illustrates a procedure of the drawing method performed on the thermal recording medium according to a third embodiment of the present disclosure.
Figure 17:
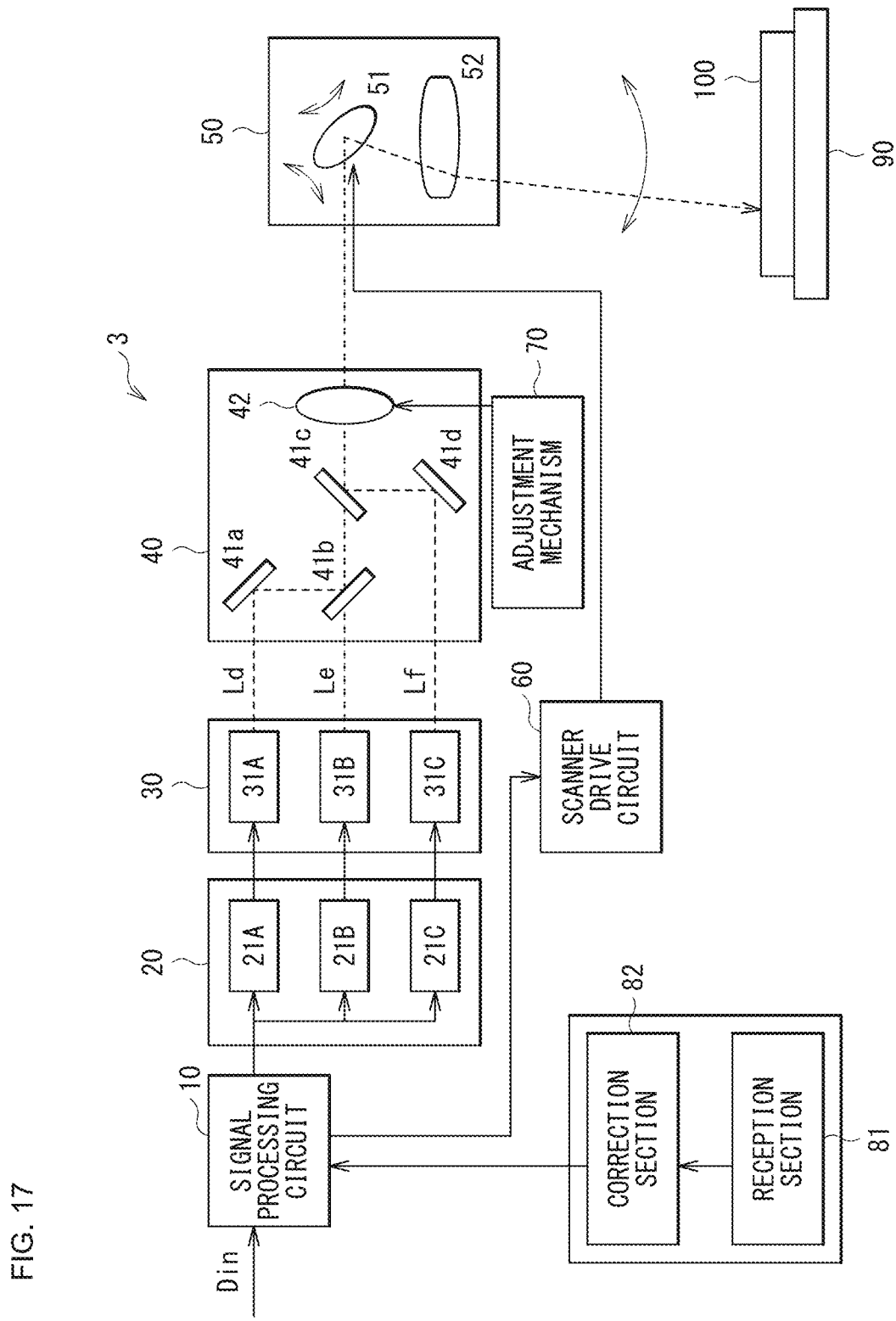
FIG. 17 illustrates an example of a system configuration of a drawing and erasing apparatus according to the third embodiment of the present disclosure.

FIG. 16 illustrates a procedure of the drawing method performed on a thermal recording medium (thermal recording medium 100) according to a third embodiment of the present disclosure. FIG. 17 illustrates an example of a system configuration of a drawing and erasing apparatus (drawing and erasing apparatus 3) according to the third embodiment of the present disclosure. In the drawing method and the erasing method according to the present embodiment, information regarding the light-transmitting member 113 is obtained, to predict the optical axis deviation of the laser beam L on the recording layer 112 from the information regarding the light-transmitting member 113, and calculate the correction amount from the result of the prediction of the optical axis deviation of the laser beam L, to subsequently perform drawing on the recording layer 112 or erasing of an image drawn on the recording layer 112. According to the present embodiment, the inputted signal Din is corrected, and drawing or erasing is performed on the basis of a correction image signal that additionally includes the correction amount calculated from the result of the prediction described above. This, for example, makes it possible to perform homogenous drawing on the recording layer 112.

(3-1. Configuration of Drawing and Erasing Apparatus)

The drawing and erasing apparatus 2 includes, for example, the signal processing circuit 10 (control section), the laser drive circuit 20, the light source section 30, the multiplexer 40, the scanner section 50, the scanner drive circuit 60, the adjustment mechanism 70, the correction mechanism 80, and the stage 90.

For example, the signal processing circuit 10 converts (color gamut conversion) the inputted signal Din (drawing signal or erasing signal) into an image signal corresponding to the wavelength of each light source (for example, each light source 31A, 31B, and 31C that is to be described later) in the light source section 30. For example, the signal processing circuit 10 generates a projection-image clock signal synchronizing with a scanner operation of the scanner section 50. The signal processing circuit 10, for example, generates a projection image signal (projection image signal for drawing or projection image signal for erasing) to cause a laser beam to emit light in accordance with the generated image signal (the correction image signal that is to be described later). The signal processing circuit 10, for example, outputs the generated projection image signal to the laser drive circuit 20. In addition, for example, the signal processing circuit 10 outputs the projection-image clock signal to the laser drive circuit 20 where necessary. Here, as described later, "where necessary" is a case of using the projection-image clock signal when synchronizing a signal source of a high-frequency signal with the image signal, etc. According to the present embodiment, the signal processing circuit 10 further determines the correction amount on the basis of the result of the calculation of the correction amount, which is fed back from the correction section 82 that is to be described later, and generates the correction image signal that includes this correction amount in addition to the inputted signal Din.

For example, the laser drive circuit 20 drives each light source 31A, 31B, and 31C in the light source section 30 in accordance with the projection image signal corresponding to each wavelength. For example, the laser drive circuit 20 controls luminance (brightness and darkness) of the laser beam to draw an image (image for drawing or image for erasing) corresponding to the projection image signal. For example, the laser drive circuit 20 includes the drive circuit 21A that drives the light source 31A, the drive circuit 21B that drives the light source 31B, and the drive circuit 21C that drives the light source 31C. The light sources 31A, 31B, and 31C each emit a laser beam of a near infrared range (700 nm to 2500 nm). For example, the light source 31A is a semiconductor laser that emits the laser beam La having the emission wavelength $\lambda 1$. For example, the light source 31B is a semiconductor laser that emits the laser beam Lb having the emission wavelength $\lambda 2$. For example, the light source 31C is a semiconductor laser that emits the laser beam Lc having the emission wavelength $\lambda 3$. For example, the emission wavelengths $\lambda 1$, $\lambda 2$, and $\lambda 3$ satisfy the following Formulas (1), (2), and (3), respectively.

$$\lambda a1-20 \text{ nm} < \lambda 1 < \lambda a1+20 \text{ nm} \tag{1}$$

$$\lambda a2-20 \text{ nm} < \lambda 2 < \lambda a2+20 \text{ nm} \tag{2}$$

$$\lambda a3-20 \text{ nm} < \lambda 3 < \lambda a3+20 \text{ nm} \tag{3}$$

Here, for example, $\lambda a1$ is an absorption wavelength (absorption peak wavelength) of the recording layer 112M and is, for example, 915 nm. For example, $\lambda a2$ is an absorption wavelength (absorption peak wavelength) of the recording layer 112C and is, for example, 860 nm. For example, $\lambda a3$ is an absorption wavelength (absorption peak wavelength) of the recording layer 112Y and is, for example, 760 nm. It is to be noted that "±20 nm" in Formulas (1), (2), and (3) represents an allowable error range. In a case where the emission wavelengths $\lambda 3$, $\lambda 2$, and $\lambda 3$ satisfy Formulas (1), (2), and (3), respectively, the emission wavelength $\lambda 1$ is 915 nm, for example, the emission wavelength $\lambda 2$ is 860 nm, for example, and the emission wavelength $\lambda 3$ is 760 nm, for example.

The light source section 30 includes a light source used in writing information to and erasing written information from the thermal recording medium 100. For example, the tight source section 30 includes the three light sources 31A, 31B, and 31C.

For example, the multiplexer 40 includes two reflection mirrors 41a and 41d and two dichroic mirrors 41b and 41c. For example, each of the laser beams La, Lb, and Lc emitted from a corresponding one of the light sources 31A, 31B, and 31C is turned into approximately parallel light (collimated light) by a collimate lens. Subsequently, for example, the laser beam La is reflected by the reflection mirror 41a and is also reflected by the dichroic mirror 41b. The laser beam Lb is transmitted through the dichroic mirrors 41b and 41c. The laser beam Lc is reflected by the reflection mirror 41d and is also reflected by the dichroic mirror 41c. This multiplexes the laser beam La, the laser beam Lb, and the laser beam Lc. The light source section 30 further includes the lens 42 that adjusts a beam shape of multiplexed light Lm obtained through multiplexing. For example, the multiplexer 40 outputs, to the scanner section 50, the multiplexed light Lm obtained through multiplexing.

For example, the scanner section 50 performs line-sequential scanning on a surface of the thermal recording medium 100 with the multiplexed light Lm entering from the multiplexer 40. The scanner section 50 includes, for example, the uniaxial scanner 52 and the fθ lens 53. For example, the uniaxial scanner 52 is a galvanometer mirror, and for example, the scanning direction by tire uniaxial scanner 52 is the mam scanning direction.

For example, the seamier drive circuit 60 drives tire scanner section 50 in synchronization with the projection-image clock signal inputted from the signal processing circuit 10. In addition, for example, in a case where the signal related to the irradiation angle of the biaxial scanner 51 or the like is inputted from the scanner section 50, the scanner drive circuit 60 drives the scanner section 50 on the basis of the signal to make a desired irradiation angle.

The adjustment mechanism 70 is a mechanism provided to adjust a focus of the multiplexed light Lm. For example, the adjustment mechanism 70 is a mechanism that adjusts a position of the lens 42 by manual operation by a user. It is to be noted that the adjustment mechanism 70 may be a mechanism that adjusts the position of the lens 42 by machine operation.

The correction mechanism 80 includes, for example, the reception section 81 and the correction section 82. For example, the reception section 81 obtains information regarding the light-transmitting member 113. The correction section 82, on the basis of the information that is regarding the light-transmitting member 113 and obtained by the reception section 81, predicts the optical axis deviation, on the recording layer 112, of the multiplexed light Lm transmitted through the light-transmitting member 113, and calculates, from the result of the prediction, the correction amount necessary for obtaining a drawn image in accordance with the inputted signal Din. Furthermore, the correction section 82 calculates the entrance angle or the shift amount of the entrance position of the multiplexed light Lm with respect to the light-transmitting member 113, which is necessary for obtaining the drawn image in accordance with the inputted signal Din, and feeds back the result of the calculation to the signal processing circuit 10.

The stage 90 fixes the thermal recording medium 100 while moving the thermal recording medium 100 in the sub-scanning direction that is orthogonal to the mam scanning direction.

(3-2. Drawing Method and Erasing Method)

Next, writing (drawing) and erasing of information to and from the thermal recording medium 100 are described with reference to FIG. 16.

(Writing)

First, the thermal recording medium 100 is prepared (Step S30.1). Next, information regarding the light-transmitting member 113 that is provided on the recording layer 112 in the thermal recording medium 100 is obtained (Step S302). Here, the information includes, for example, the surface shape and the refractive index, etc., of the light-transmitting member 113. These may be inputted from outside or may be measured by the drawing and erasing apparatus 1.

Figure 18A:
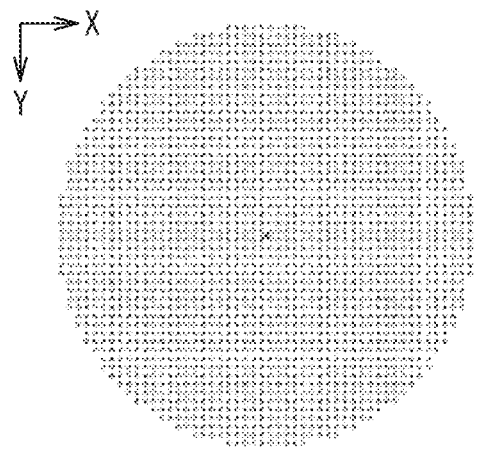
FIG. 18A is an example of an input image.
Figure 18B:
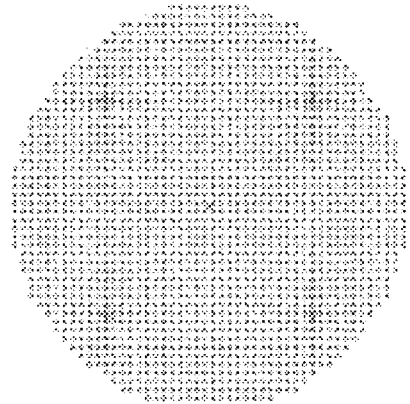
FIG. 18B is an example of distortion prediction of an input image by simulation.

Subsequently, on the basis of the information regarding the light-transmitting member 113, the optical axis deviation of the multiplexed light Lm transmitted through the light-transmitting member 113 is predicted (Step S303). FIG. 18A illustrates an example of an input image. FIG. 18B illustrates a prediction of a distortion of the input image by simulation.

Figure 18C:
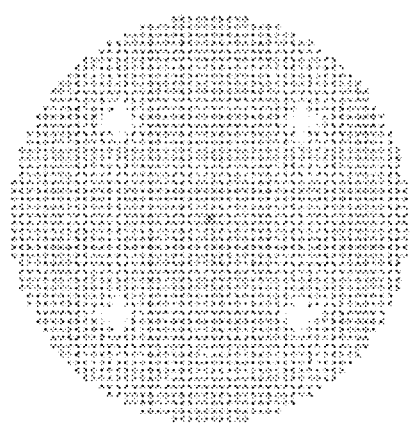
FIG. 18C is an example of a corrected image that is corrected through distortion prediction of the input image illustrated in FIG. 18A.

Next, the correction amount is calculated from the result of the prediction described above (Step S304). Subsequently, for example, the result of the calculation is fed back to the signal processing circuit 10 (Step S305). The signal processing circuit 10 determines the correction amount on the basis of the result of the calculation (Step S306), to subsequently generate the correction image signal that is a signal generated as a result of correcting the inputted signal Din (for example, FIG. 18C), to start drawing on the thermal recording medium 100 using this correction image signal (Step S307).

Drawing on the thermal recording medium 100 is performed as follows. First, the thermal recording medium 100 is set to the stage 90. Next, on the basis of the input image signal (drawing signal D1in), the signal processing circuit 10 selects the light source that is to be driven. The signal processing circuit 10 generates the projection image signal to drive the light source selected on the basis of the drawing signal Dim. The signal processing circuit 10 outputs the generated projection image signal to the laser drive circuit 20, to control the light source section 30. This causes, for example, the thermal recording medium 100 to be irradiated, from the set of the drawing and erasing apparatus 1, with the multiplexed light Lm1 obtained as a result of appropriately multiplexing the laser beam La having an emission wavelength of 915 nm, the laser beam Lb of 860 nm, and the laser beam Lc of 760 nm.

As a result, for example, the laser beam La having the emission wavelength of 915 nm is absorbed by the photothermal converting agent in the recording layer 112M, and the heat generated by the photothermal converting agent causes the leuco dye in the recording layer 112M to reach a writing temperature and combine with the developing/reducing agent, to turn magenta. The color optical density of magenta depends on the intensity of the laser beam having the emission wavelength of 915 nm. In addition, the laser beam having the emission wavelength of 860 nm is absorbed by the photothermal converting agent in the recording layer 112C, and thereby the heat generated from the photothermal converting agent causes the leuco dye in the recording layer 112C to reach the writing temperature and combine with the developing/reducing agent, to turn cyan. The color optical density of cyan depends on the intensity of the laser beam having the emission wavelength of 860 nm. In addition, the laser beam having the emission wavelength of 760 nm is absorbed by the photothermal converting agent in the recording layer 112Y, and thereby the heat generated from the photothermal converting agent causes the leuco dye in the recording layer 112Y to reach the writing temperature and combine with the developing/reducing agent, to turn yellow. The color optical density of yellow depends on the intensity of the laser beam having tire emission wavelength of 760 nm. As a result, a mixture of magenta, cyan, and yellow develops into a desired color. In this manner, information is written to the thermal recording medium 100, (Erasing)

The procedure of the drawing method illustrated in FIG. 16 is also applied to erasing of information written on the thermal recording medium 100. First, the thermal recording medium 100 on which information is written as described above is prepared (Step S301), and set to the drawing and erasing apparatus 2. Then, as in writing, information regarding the light-transmitting member 113 that is provided on the recording layer 112 in the thermal recording medium 100 is obtained (Step S302), and after predicting the optical axis deviation (Step S303), calculating the correction amount (Step S304), feeding back the result of the calculation to the signal processing circuit 10 (Step S305), and determining the correction amount (Step S306), the correction image signal generated as a result of correcting the input image information for erasing is generated, to start the erasing operation.

The light source section 30 is controlled to irradiate, with a laser beam, the thermal recording medium 100 set to the drawing and erasing apparatus 1. At this time, when irradiating the thermal recording medium 100 with the laser beam, the signal processing circuit 10 uses the laser beam La having the emission wavelength $\lambda 1$, the laser beam Lb having the emission wavelength $\lambda 2$, and the laser beam Lc having the emission wavelength $\lambda 3$.

Here, it is assumed that the wavelengths $\lambda 1$, $\lambda 2$, and $\lambda 3$ satisfy Formulas (1), (2), and (3) above, respectively. In this case, for example, the laser beam La having the emission wavelength $\lambda 1$ (for example, 915 nm) is absorbed by the photothermal converting agent in the recording layer 112M. In addition, for example, the laser beam Lb having the emission wavelength λ2 (for example, 860 nm) is absorbed by the photothermal converting agent in the recording layer 112C. In addition, for example, the laser beam Lc having the emission wavelength λ3 (for example, 760 nm) is absorbed by the photothermal converting agent in the recording layer 113Y. Consequently, the heat generated from the photothermal converting agent in each of the recording layers 112M, 112C, and 112Y causes the leuco dye in each recording layer 112 to reach an erasing temperature and separate from the developing/reducing agent to be decolored. In this manner, the drawing and erasing apparatus 1 erases information written (drawn image) on the thermal recording medium 100.

(3-3. Workings and Effects)

As described above, in the drawing method and the erasing method performed on the thermal recording medium 100 according to the present embodiment, the correction amount for the optical axis deviation of the laser beam due to the light-transmitting member 113 is previously determined, to subsequently generate the correction image signal generated as a result of correcting the input image signal, and start drawing on the thermal recording medium 100 on the basis of this. This causes writing to be performed on the thermal recording medium 100 in accordance with the input image signal. In other words, this makes it possible to perform drawing on the recording layer 112 without distortion, thus making it possible to improve display quality.

4. APPLICATION EXAMPLES

The drawing method and the erasing method described in each of the foregoing first to third embodiments are applicable to, for example, drawing and erasing to be performed on the thermal recording medium (thermal recording medium 100) applied to an electronic watch 400, a smartphone 500, an automobile 600, a heated tobacco product 700, a 3D printed matter 800, and the like as illustrated in FIGS. 19 to 23. However, the configuration of the electronic watch 400 or the like using the thermal recording medium 100 as described in the following is a mere example, and is modifiable as appropriate. The thermal recording medium 100 is applicable to a portion of various electronic devices or clothing accessories. For example, as what is called a wearable terminal, it is possible to apply the thermal recording medium 100 to a portion of a clothing accessory such as a watch (wristwatch), a bag, clothing, a hat, a helmet, a headset, eyeglasses, and shoes, for example. Other than this, the type of the electronic device is not particularly limitative and includes, for example, a wearable display such as a heads-up display and a head-mounted display, a portable device having portability such as a portable audio player and a handheld game console, a robot, or a refrigerator, a washing machine, or the like. In addition, as a decorating member, for example, the thermal recording medium 100 is applicable not only to the electronic device or the clothing accessory, but also to an exterior of a holder or a case for a heated tobacco product, an electronic cigarette, or the like, an interior or exterior of an automobile, an interior or exterior of a building such as a wall, an exterior of furniture such as a desk, or the like.

Application Example 1

Figure 19:
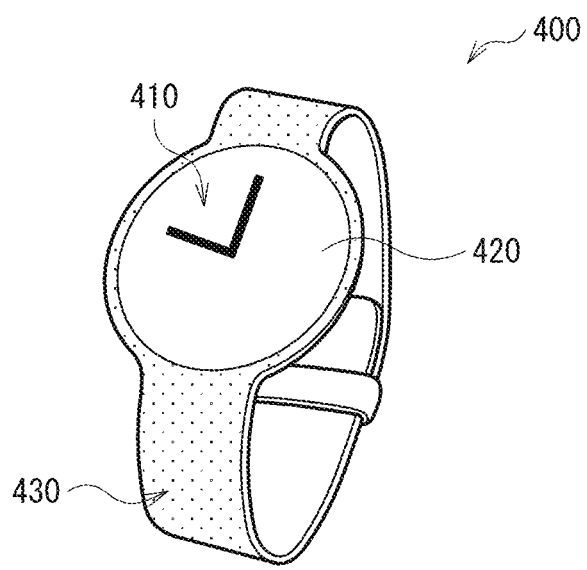
FIG. 19 is a perspective view that illustrates an example of an appearance of Application Example 1.

FIG. 19 illustrates an appearance of the electronic watch 400 (an electronic device integrated with a wristwatch). This electronic watch includes, for example, a dial (character-information display portion) 410, a protective glass 420, and a band 430. The dial 410 corresponds to the recording layer 112, and the protective glass 420 corresponds to the light-transmitting member 113, for example. The foregoing drawing method and erasing method make it possible to rewrite various characters and patterns on the dial 410, for example. For example, the band 430 is a portion attachable to an arm or the like. Providing likewise the recording layer 112 in the band 430 makes it possible to display various colors and patterns, thus making it possible to change the design of the band 430.

Application Example 2

Figure 20A:
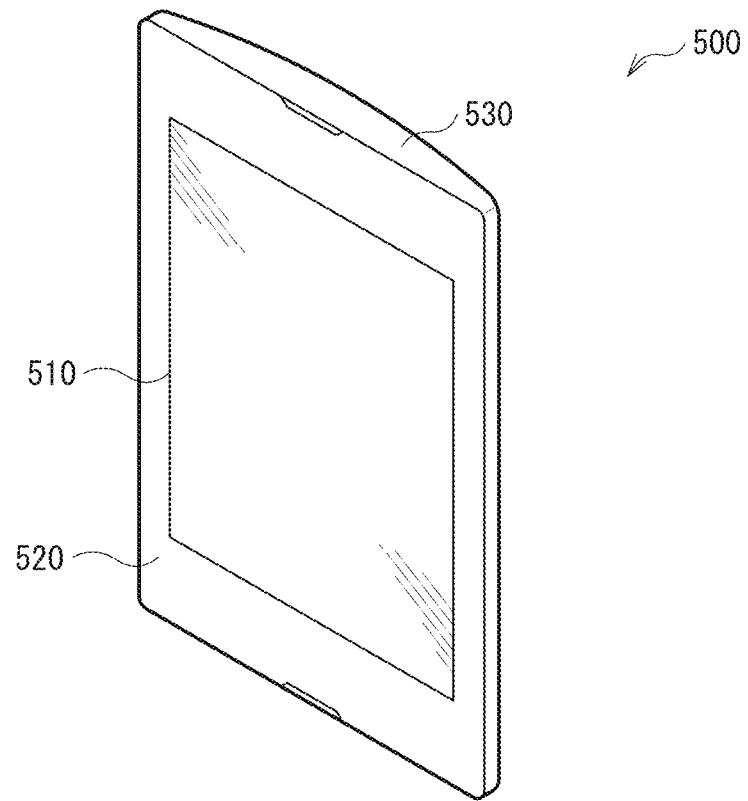
FIG. 20A is a perspective view that illustrates an example of an appearance (front surface side) of Application Example 2.
Figure 20B:
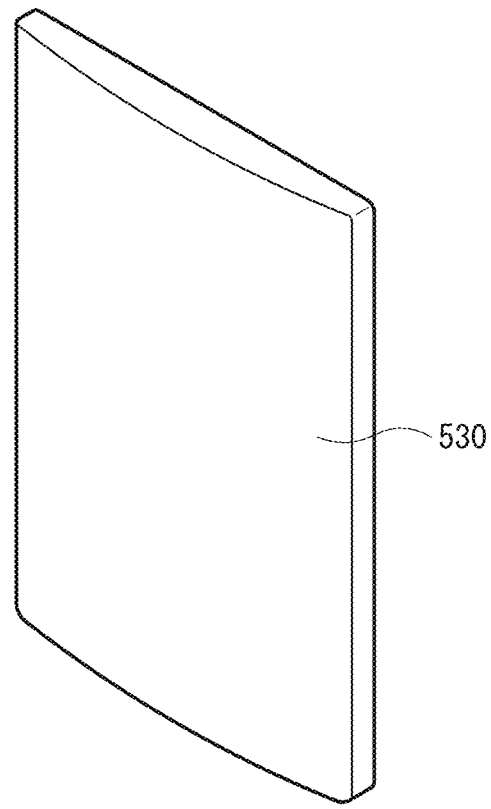
FIG. 20B is a perspective view that illustrates an example of an appearance (rear surface side) of Application Example 2.

FIG. 20A illustrates a configuration of an appearance of a front surface of the smartphone 500, and FIG. 20B illustrates a configuration of an appearance of a rear surface of the smartphone illustrated in FIG. 20A. For example, this smartphone includes a display section 510 and anon-display section 520, and a housing 530. In a surface of the housing 530 on the rear surface side, for example, the thermal recording medium 100 is provided as an exterior member of the housing 530, for example, and this makes it possible to display various colors and patterns. It is to be noted that a smartphone is given as an example here, but the thermal recording medium 100 is applicable not only to this but also to a laptop personal computer (PC), a tablet PC, or the like, for example.

Application Example 3

Figure 21A:
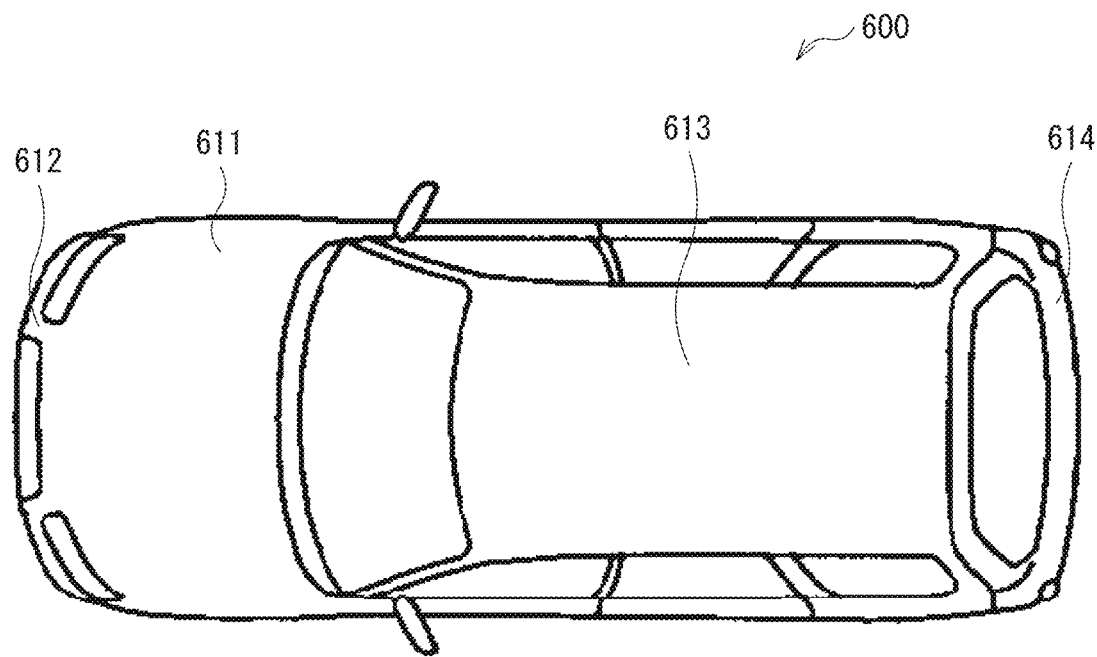
FIG. 21A is a perspective view that illustrates an example of an appearance (upper surface) of Application Example 3.
Figure 21B:
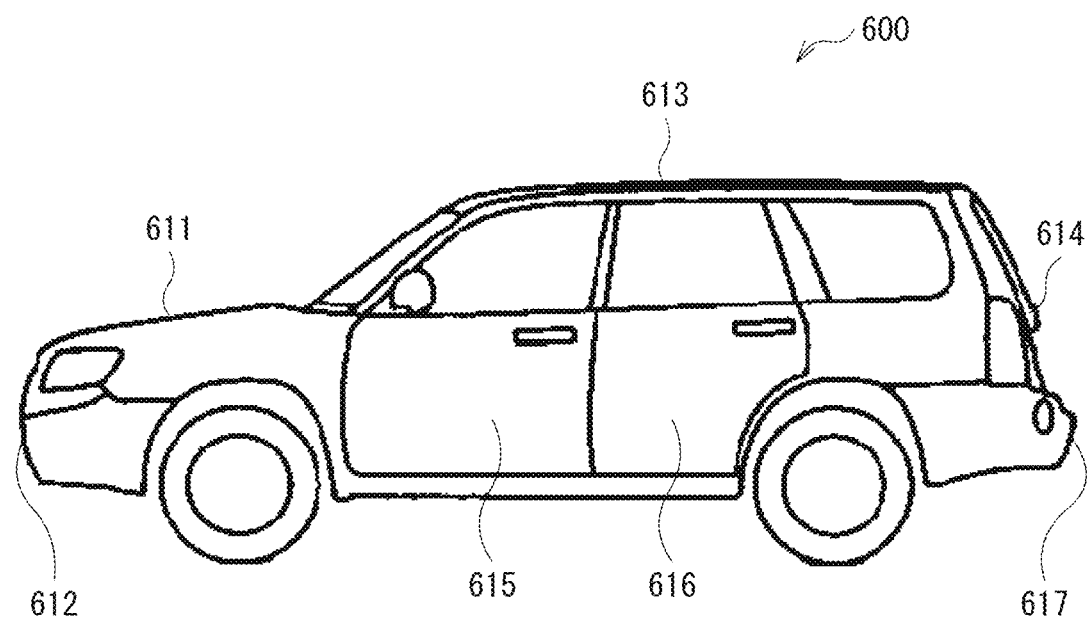
FIG. 21B is a perspective view that illustrates an example of an appearance (side surface) of Application Example 3.

FIG. 21A illustrates an appearance of an upper surface of the automobile 600, and FIG. 21B illustrates an appearance of a side surface of the automobile. For example, providing the thermal recording medium 100 or the like according to the present disclosure in a vehicle body such as a bonnet 611, a bumper 612, a roof 613, a boot lid 614, a front door 615, a rear door 616, and a real bumper 617 makes it possible to display various information as well as colors and patterns in each portion. In addition, for example, providing the thermal recording medium 100 in an interior of the automobile such as a steering wheel or dashboard allows display of various colors and patterns.

Application Example 4

Figure 22:
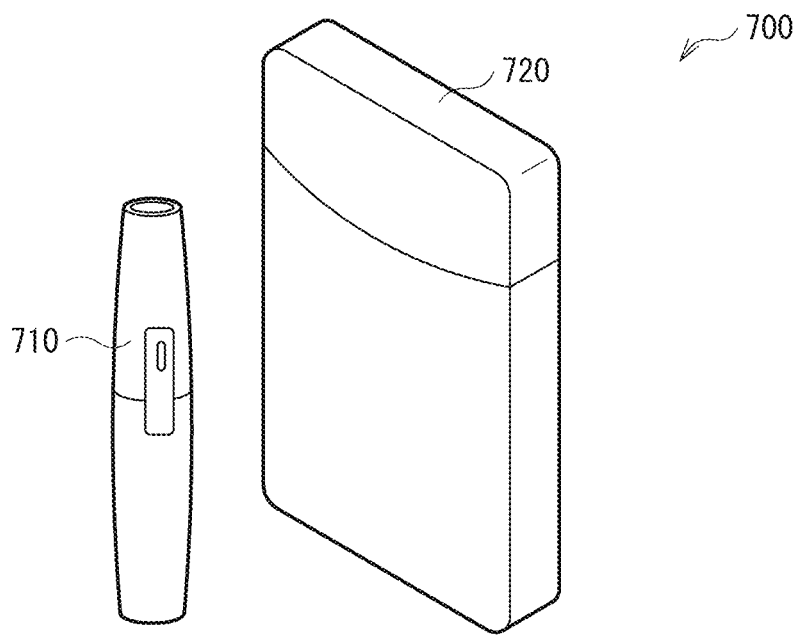
FIG. 22 is a perspective view that illustrates an example of Application Example 4.

FIG. 22 illustrates an appearance of a cigarette holder 710 and a case 720 of the heated tobacco product 700. For example, providing the thermal recording medium 100 according to the present disclosure in a surface of a housing such as the cigarette holder 710 and the case 720 of the heated tobacco product allows display of various information as well as colors and patterns in each portion and rewriting thereof.

Application Example 5

Figure 23:
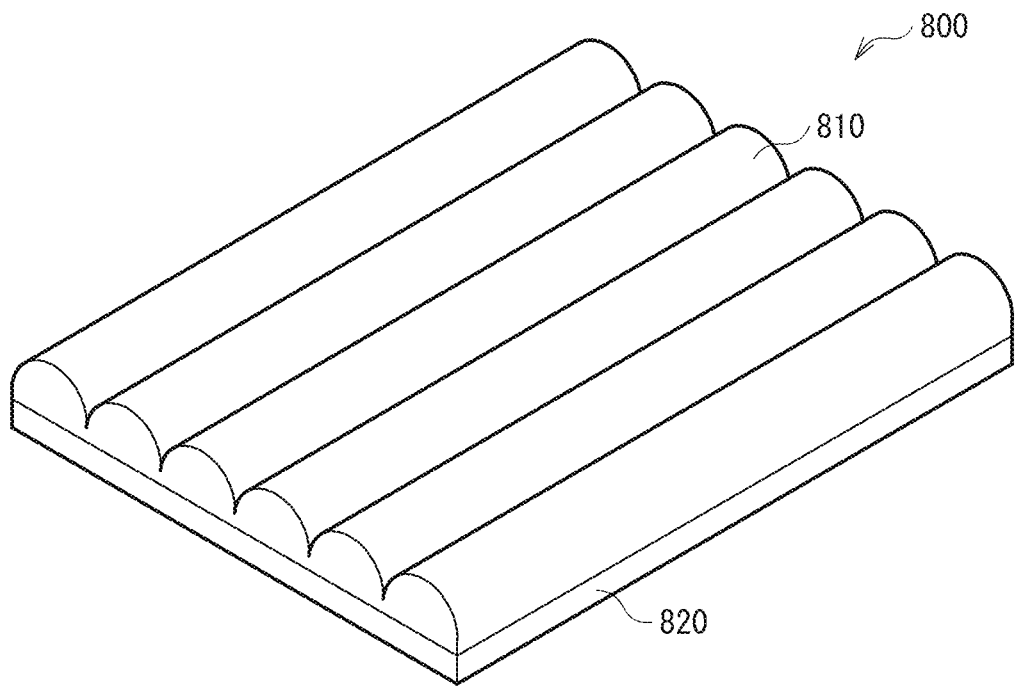
FIG. 23 is a schematic diagram that illustrates an example of a configuration of Application Example 5.

FIG. 23 is a schematic diagram that illustrates a configuration of the 3D printed matter 800. The 3D printed matter 800 is a printed matter having a pattern that varies depending on a viewing angle or gives solid feeling. For example, the 3D printed matter 800 includes a lenticular sheet 810 and a base material 820 that are bonded together. In the lenticular sheet 810, semi-cylindrical convex lenses are linearly arranged, and on the base material 820, an image linearly synthesized in accordance with a pitch between the convex lenses is printed. Use of the light-transmitting member 113 in the thermal recording medium 100 according to the present disclosure for this lenticular sheet 810 and use of the recording layer 112 for the base material 820 makes it possible to achieve the configuration of the 3D printed matter that allows display of various information as well as colors and patterns and rewriting thereof.

5. EXAMPLES

Next, Examples of the drawing method and the erasing method according to the foregoing first to third embodiments are described.

First, on a support base, recording layers that were to have respective colors of cyan (C), magenta (M), and yellow (Y) were formed in order, and a light-transmitting member having a predetermined uneven shape was formed on the recording layer that was to turn yellow (Y), and thus a thermal recording medium was prepared. Using each correction method shown in Table 1, solid drawing was performed on this in each color of CMY in a 5 cm×5 cm region (Experimental Examples 1 to 23). For a drawing condition, a laser power to cause an optical density (OD) of each color to be yellow (Y): 1.2, magenta (M): 1.6, and cyan (C): 1.6 was selected. At the time, a difference $OD_{(max-min)}$ between a maximum OD ($OD_{max}$) and a minimum OD ($OD_{min}$) at 25 points in the plane was defined as drawing unevenness. In addition, whether or not there was drawing unevenness was visually evaluated to identify a case where unevenness was not recognized as A and a case where unevenness was recognized as B.

Each parameter (pitch (l), height (h), tilt angle (θ), and refractive index (n)) of the light-transmitting member is assumed to correspond to FIG. 5. Table 1 summarizes results of the configuration of the light-transmitting member, the correction method used in each Experimental Example 1 to 24, the OD difference ($OD_{(max-min)}$) in each color (C, M, and Y), and visual unevenness. A correction method 1 is a correction method using the optical member described in the foregoing first embodiment. A correction method 2 is a correction method that is to move the stage described in the foregoing second embodiment. A correction method 3 is a correction method using the correction image signal as described in the foregoing third embodiment.

Experimental Example 1

In Experimental Example 1, using the correction method 1, drawing was performed on a thermal recording medium including a light-transmitting member having a pitch (l) of 10 mm, a height (h) of 5 mm, a tilt angle (θ) of 20°, and a refractive index (n) of 1.5.

Experimental Example 2

In Experimental Example 2, using the correction method 1, drawing was performed on a thermal recording medium including a light-transmitting member having a pitch (l) of 10 mm, a height (h) of 1 mm, a tilt angle (θ) of 20°, and a refractive index (n) of 1.5.

Experimental Example 3

In Experimental Example 3, using the correction method 1, drawing was performed on a thermal recording medium including a light-transmitting member having a pitch (l) of 10 mm, a height (h) of 3 mm, a tilt angle (θ) of 20°, and a refractive index (n) of 1.5.

Experimental Example 4

In Experimental Example 4, using the correction method 1, drawing was performed on a thermal recording medium including a light-transmitting member having a pitch (l) of 10 mm, a height (h) of 5 mm, a tilt angle (θ) of 5°, and a refractive index (n) of 1.5.

Experimental Example 5

In Experimental Example 5, using the correction method 1, drawing was performed on a thermal recording medium including a light-transmitting member having a pitch (l) of 10 mm, a height (h) of 5 mm, a tilt angle (θ) of 10°, and a refractive index (n) of 1.5.

Experimental Example 6

In Experimental Example 6, using the correction method 1, drawing was performed on a thermal recording medium including a light-transmitting member having a pitch (l) of 10 mm, a height (h) of 5 mm, a tilt angle (θ) of 30°, and a refractive index (n) of 1.5.

Experimental Example 7

In Experimental Example 7, using the correction method 1, drawing was performed on a thermal recording medium including a light-transmitting member having a pitch (l) of 5 mm, a height (h) of 5 mm, a tilt angle (θ) of 20°, and a refractive index (n) of 1.5.

Experimental Example 8

In Experimental Example 8, using the correction method 1, drawing was performed on a thermal recording medium including a light-transmitting member having a pitch (l) of 20 mm, a height (h) of 5 mm, a tilt angle (θ) of 20°, and a refractive index (n) of 1.5.

Experimental Example 9

In Experimental Example 9, using the correction method 2, drawing was performed on a thermal recording medium including a light-transmitting member having a pitch (l) of 10 mm, a height (h) of 5 mm, a tilt angle (θ) of 20°, and a refractive index (n) of 1.5.

Experimental Example 10

In Experimental Example 10, using the correction method 2, drawing was performed on a thermal recording medium including a light-transmitting member having a pitch (l) of 10 mm, a height (h) of 5 mm, a tilt angle (θ) of 5°, and a refractive index (n) of 1.5.

Experimental Example 11

In Experimental Example 11, using the correction method 2, drawing was performed on a thermal recording medium including a light-transmitting member having a pitch (l) of 20 mm, a height (h) of 5 mm, a tilt angle (θ) of 20°, and a refractive index (n) of 1.5.

Experimental Example 12

In Experimental Example 1, using the correction method 3, drawing was performed on a thermal recording medium including a light-transmitting member having a pitch (l) of 10 mm, a height (h) of 5 mm, a tilt angle (θ) of 20°, and a refractive index (n) of 1.5.

Experimental Example 13

In Experimental Example 2, using the correction method 3, drawing was performed on a thermal recording medium including a light-transmitting member having a pitch (l) of 10 mm, a height (h) of 5 mm, a tilt angle (θ) of 5°, and a refractive index (n) of 1.5.

Experimental Example 14

In Experimental Example 3, using the correction method 3, drawing was performed on a thermal recording medium including a light-transmitting member having a pitch (l) of 20 mm, a height (h) of 5 mm, a tilt angle (θ) of 20°, and a refractive index (n) of 1.5.

Experimental Example 15

In Experimental Example 4, without correction, drawing was performed on a thermal recording medium including a light-transmitting member having a height (h) of 5 mm and a refractive index (n) of 1.5.

Experimental Example 16

In Experimental Example 5, without correction, drawing was performed on a thermal recording medium including a light-transmitting member having a pitch (l) of 10 mm, a height (h) of 5 mm, a tilt angle (θ) of 20°, and a refractive index (n) of 1.5.

Experimental Example 17

In Experimental Example 6, without correction, drawing was performed on a thermal recording medium including a light-transmitting member having a pitch (l) of 10 mm, a height (h) of 1 mm, a tilt angle (θ) of 20°, and a refractive index (n) of 1.5.

Experimental Example 18

In Experimental Example 7, without correction, drawing was performed on a thermal recording medium including a light-transmitting member having a pitch (l) of 5 mm, a height (h) of 3 mm, a tilt angle (θ) of 20°, and a refractive index (n) of 1.5.

Experimental Example 19

In Experimental Example 8, without correction, drawing was performed on a thermal recording medium including a light-transmitting member having a pitch (l) of 20 mm, a height (h) of 5 mm, a tilt angle (θ) of 5°, and a refractive index (n) of 1.5.

Experimental Example 20

In Experimental Example 8, without correction, drawing was performed on a thermal recording medium including a light-transmitting member having a pitch (l) of 10 mm, a height (h) of 5 mm, a tilt angle (θ) of 10°, and a refractive index (n) of 1.5.

Experimental Example 21

In Experimental Example 8, without correction, drawing was performed on a thermal recording medium including a light-transmitting member having a pitch (l) of 10 mm, a height (h) of 5 mm, a tilt angle (θ) of 30°, and a refractive index (n) of 1.5.

Experimental Example 22

In Experimental Example 8, without correction, drawing was performed on a thermal recording medium including a light-transmitting member having a pitch (l) of 5 mm, a height (h) of 5 mm, a tilt angle (θ) of 20°, and a refractive index (n) of 1.5.

Experimental Example 23

In Experimental Example 8, without correction, drawing was performed on a thermal recording medium including a light-transmitting member having a pitch (l) of 20 mm, a height (h) of 5 mm, a tilt angle (θ) of 20°, and a refractive index (n) of 1.5.

TABLE 1

| | Configuration of light-transmitting member | | | | | $OD_{(max-min)}$ | | | Visual unevenness | | |
|---|---|---|---|---|---|---|---|---|---|---|---|
| | Pitch (l) | Height (h) | Tilt angle (θ) | Refractive index (n) | Correction method | M | C | C | C | M | C |
| Experimental Example 1 | 10 mm | 5 mm | 20° | 1.5 | 1 | ≤0.1 | ≤0.1 | ≤0.1 | A | A | A |
| Experimental Example 2 | 10 mm | 1 mm | 20° | 1.5 | 1 | ≤0.1 | ≤0.1 | ≤0.1 | A | A | A |
| Experimental Example 3 | 10 mm | 3 mm | 20° | 1.5 | 1 | ≤0.1 | ≤0.1 | ≤0.1 | A | A | A |
| Experimental Example 4 | 10 mm | 5 mm | 5° | 1.5 | 1 | ≤0.1 | ≤0.1 | ≤0.1 | A | A | A |
| Experimental Example 5 | 10 mm | 5 mm | 10° | 1.5 | 1 | ≤0.1 | ≤0.1 | ≤0.1 | A | A | A |
| Experimental Example 6 | 10 mm | 5 mm | 30° | 1.5 | 1 | ≤0.1 | ≤0.1 | ≤0.1 | A | A | A |
| Experimental Example 7 | 5 mm | 5 mm | 20° | 1.5 | 1 | ≤0.1 | ≤0.1 | ≤0.1 | A | A | A |
| Experimental Example 8 | 20 mm | 5 mm | 20° | 1.5 | 1 | ≤0.1 | ≤0.1 | ≤0.1 | A | A | A |

TABLE 1-continued

| | Configuration of light-transmitting member | | | | | OD$_{(max-min)}$ | | | Visual unevenness | | |
|---|---|---|---|---|---|---|---|---|---|---|---|
| | Pitch (l) | Height (h) | Tilt angle (θ) | Refractive index (n) | Correction method | M | C | C | C | M | C |
| Experimental Example 9 | 10 mm | 5 mm | 20° | 1.5 | 2 | ≤0.1 | ≤0.1 | ≤0.1 | A | A | A |
| Experimental Example 10 | 10 mm | 5 mm | 5° | 1.5 | 2 | ≤0.1 | ≤0.1 | ≤0.1 | A | A | A |
| Experimental Example 11 | 20 mm | 5 mm | 20° | 1.5 | 2 | ≤0.1 | ≤0.1 | ≤0.1 | A | A | A |
| Experimental Example 12 | 10 mm | 5 mm | 20° | 1.5 | 3 | ≤0.1 | ≤0.1 | ≤0.1 | A | A | A |
| Experimental Example 13 | 10 mm | 5 mm | 5° | 1.5 | 3 | ≤0.1 | ≤0.1 | ≤0.1 | A | A | A |
| Experimental Example 14 | 20 mm | 5 mm | 20° | 1.5 | 3 | ≤0.1 | ≤0.1 | ≤0.1 | A | A | A |
| Experimental Example 15 | — | 5 mm | 0° | 1.5 | — | ≤0.1 | ≤0.1 | ≤0.1 | A | A | A |
| Experimental Example 16 | 10 mm | 5 mm | 20° | 1.5 | — | 0.2 | 0.3 | 0.4 | A | B | B |
| Experimental Example 17 | 10 mm | 1 mm | 20° | 1.5 | — | 0.1 | 0.2 | 0.2 | A | B | B |
| Experimental Example 18 | 10 mm | 3 mm | 20° | 1.5 | — | 0.2 | 0.3 | 0.3 | A | B | B |
| Experimental Example 19 | 10 mm | 5 mm | 5° | 1.5 | — | 0.1 | 0.2 | 0.2 | A | B | B |
| Experimental Example 20 | 10 mm | 5 mm | 10° | 1.5 | — | 0.2 | 0.3 | 0.3 | A | B | B |
| Experimental Example 21 | 10 mm | 5 mm | 30° | 1.5 | — | 0.3 | 0.4 | 0.5 | B | B | B |
| Experimental Example 22 | 5 mm | 5 mm | 20° | 1.5 | — | 0.3 | 0.5 | 0.5 | B | B | B |
| Experimental Example 23 | 20 mm | 5 mm | 20° | 1.5 | — | 0.1 | 0.2 | 0.2 | A | B | B |

Table 1 shows that in Experimental Example 15 in which the light-transmitting member having a flat surface was included, as in Experimental Examples 1 to 14, visual unevenness was not recognized, and there was a small optical density difference (OD$_{(max-min)}$) of not more than 0.1. On the other hand, in any of Experimental Examples 16 to 23 in which the light-transmitting member having an uneven shape in a surface was included and drawing was performed without using the correction method, visual unevenness was recognized, and the thermal recording medium including the light-transmitting member receiving a larger influence of light refraction indicated a larger optical density difference. In contrast, in Experimental Examples 1 to 14 using the correction methods 1 to 3, visual unevenness was not recognized irrespective of the shape of the light-transmitting member. In addition, there was a small optical density difference (OD$_{(max-min)}$) of not more than 0.1.

The above result shows that simulating the distortion corresponding to the shape and the refractive index of the light-transmitting member and feeding back the result to perform drawing or erasing makes it possible to perform drawing or erasing of good quality without distortion. In addition, the correction method thereof includes correction using an optical member, correction using a stage, correction of an image, etc., and the type thereof is not limited.

The present disclosure has been described with reference to the first to the third embodiments and the modification examples, and Examples, but the present disclosure is not limited to the modes described in the foregoing embodiments, etc., and various modifications are possible. For example, it is not necessary to include all the components described in the foregoing embodiments, etc., and another component may further be included. In addition, the material and thickness of the components described above are examples, and are not limited to those described.

For example, in the foregoing first embodiment, an example in which the recording layer 112 (in FIG. 3, the recording layer 112M) is provided directly on the support substrate 111 has been illustrated. However, for example, a layer having a configuration similar to that of the heat insulating layers 114 and 115 or the like may be additionally provided between the support substrate 111 and the recording layer 112M.

Furthermore, in the foregoing first embodiment as the thermal recording medium 100, an example has been illustrated in which the three types of recording layers 112 (112M, 112C, and 112Y) that are to develop colors different from each other are stacked with each of the heat insulating layers 114 and 115 therebetween, but this is not limitative. For example, a reversible recording medium that allows multicolor display by a single layer structure may be used, which includes, for example, a mixture of three types of coloring compounds that are each enclosed in a microcapsule and are to develop colors different from each other. Furthermore, for example, without being limited to the microcapsule, a reversible recording medium that includes a recording layer including a three-dimensional structure in a fibrous state may be used.

It is preferable that a fiber used here have, for example, what is called a core-sheath structure that includes a core containing a coloring compound that is to develop a desired color, and a developing/reducing agent and a photothermal converting agent corresponding thereto, and a sheath that covers this core and includes a heat insulating material.

Forming the three-dimensional structure with use of a plurality of types of fibers having the core-sheath structure and including coloring compounds that are to develop colors different from each other makes it possible to manufacture a reversible recording medium that allows multicolor display.

In addition, in the foregoing embodiments, etc., the present technology has been described using the thermal recording medium 100 that allows multicolor display, but the thermal recording medium for single-color display using one type of coloring compound may be used, for example.

Furthermore, in the foregoing embodiments, etc., an example of performing, using one apparatus, drawing on the thermal recording medium 100 and erasing of an image drawn on the thermal recording medium 100 has been described, but a separate apparatus may be used for each of the drawing and erasing. Furthermore, in addition, in the foregoing embodiments, etc., the present technology has been described with reference to, as an example of the thermal recording medium, a recording medium having reversibility that allows recording and erasing of information. However, it is not entirely necessary for the recording medium to have reversibility. As long as the thermal recording medium performs noncontact drawing using a laser, the present technology is applicable irrespective of the shape, whether or not the coloring compound has color-developing and decoloring reversibility, and the purpose.

It is to be noted that the present disclosure may also have the following configurations. According to the present technology having the following configurations, information regarding the light-transmitting member is obtained to predict the optical axis deviation of a laser beam on the recording layer on the basis of the information regarding the light-transmitting member and calculate the correction amount from the result of the prediction of the optical axis deviation of the laser beam. Therefore, it is possible to perform drawing on the recording layer or erasing of an image drawn on the recording layer irrespective of the shape of the light-transmitting member. This accordingly makes it possible to improve display quality. Furthermore, the drawing method and the erasing method according to the present technology makes it possible to perform on-demand drawing in accordance with customer needs. In addition, unlike a previously-printed product, for example, it is not necessary to hold a commodity in stock. Furthermore, the thermal recording medium that allows repeated writing and erasing also allows rewriting where necessary. It is to be noted that the effects described above are not necessarily limitative, and may be any effect described in the present disclosure.

(1)
A drawing method used when performing drawing on a thermal recording medium that includes a light-transmitting member above a recording layer, the drawing method including:
obtaining information regarding the light-transmitting member;
predicting an optical axis deviation of a laser beam in the recording layer from the information regarding the light-transmitting member; and
calculating a correction amount from a result of the predicting of the optical axis deviation.

(2)
The drawing method according to (1), in which after calculating the correction amount, the thermal recording medium is irradiated with the laser beam.

(3)
The drawing method according to (1) or (2), in which an entrance angle, an entrance position, or both of the laser beam with respect to the light-transmitting member is adjusted using an optical member, to correct the optical axis deviation of the laser beam.

(4)
The drawing method according to any one of (1) to (3), in which a pedestal section to which the thermal recording medium is fixed is moved to adjust an entrance angle, an entrance position, or both of the laser beam with respect to the light-transmitting member, to correct the optical axis deviation of the laser beam.

(5)
The drawing method according to any one of (1) to (4), in which a correction amount is calculated on a basis of a result of calculating the optical axis deviation of the laser beam, and input image information is corrected on a basis of the correction amount.

(6)
The drawing method according to any one of (1) to (5), in which information regarding a surface shape of the light-transmitting member and information regarding a refractive index of the light-transmitting member are obtained as the information regarding the light-transmitting member.

(7)
The drawing method according to any one of (1) to (6), in which
the recording layer includes a coloring compound having an electron-donating property, a developer having an electron-accepting property, a photothermal converting agent, and a polymeric material, and
drawing is performed on the recording layer through irradiation with the laser beam.

(8)
An erasing method used when erasing an image from a thermal recording medium that includes a light-transmitting member above a recording layer, the erasing method including:
obtaining information regarding the light-transmitting member;
predicting an optical axis deviation of a laser beam in the recording layer from the information regarding the light-transmitting member; and
calculating a correction amount from a result of the predicting of the optical axis deviation.

(9)
The erasing method according to (8), in which
the recording layer includes a coloring compound having an electron-donating property, a developing/reducing agent having an electron-accepting property, a photothermal converting agent, and a polymeric material, and
the image drawn on the recording layer is erased through irradiation with the laser beam.

(10)
A drawing apparatus, including:
a light source section that emits a laser beam;
a scanner section that performs scanning on a thermal recording medium with the laser beam emitted from the light source section, the thermal recording medium including a light-transmitting member above a recording layer;
a reception section that obtains information regarding the light-transmitting member; and
a correction section that predicts, from the information regarding the light-transmitting member, an optical axis deviation of the laser beam in the recording layer and calculates a correction amount from a result of the prediction, the information being obtained by the reception section, and the laser beam being transmitted through the light-transmitting member.

(11)

The drawing apparatus according to (10), further including a control section, in which the correction section feeds back a result of the calculation of the correction amount to the control section.

(12)

The drawing apparatus according to (11), in which the control section determines a correction amount on a basis of the result of the calculation of the correction amount fed back from the correction section.

(13)

The drawing apparatus according to any one of (10) to (12), in which the scanner section includes a first optical member and a second optical member, the first optical member performing scanning on the thermal recording medium with the laser beam emitted from the light source section, the thermal recording medium including the light-transmitting member above the recording layer, and the second optical member adjusting an entrance angle, an entrance position, or both of the laser beam entering the light-transmitting member.

(14)

The drawing apparatus according to (13), further including a first adjustment mechanism that adjusts the second optical member on a basis of the correction amount calculated by the correction section.

(15)

The drawing apparatus according to any one of (10) to (14), further including a pedestal section that fixes the thermal recording medium.

(16)

The drawing apparatus according to (15), further including a second adjustment mechanism that adjusts a position and an angle of the pedestal section on a basis of the correction amount calculated by the correction section.

(17)

The drawing apparatus according to any one of (12) to (16), in which the control section corrects an input image signal on a basis of the determined correction amount.

(18)

The drawing apparatus according to any one of (10) to (17), in which the recording layer includes a coloring compound having an electron-donating property, a developer or developing/reducing agent that has an electron-accepting property, a photothermal converting agent, and a polymeric material.

The present application claims the priority on the basis of Japanese Patent Application No. 2018-204198 filed on Oct. 30, 2018 with Japan Patent Office, the entire contents of which are incorporated in the present application by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A drawing method used when performing drawing on a thermal recording medium that includes a light-transmitting member above a recording layer, the drawing method comprising:

obtaining information regarding the light-transmitting member, wherein the information regarding the light-transmitting member comprises a surface shape of the light-transmitting member, and wherein the surface shape is not flat;

predicting an optical axis deviation of a laser beam in the recording layer from the information regarding the light-transmitting member; and calculating a correction amount from a result of the predicting of the optical axis deviation.

2. The drawing method according to claim 1, wherein after calculating the correction amount, the thermal recording medium is irradiated with the laser beam.

3. The drawing method according to claim 1, wherein an entrance angle, an entrance position, or both of the laser beam with respect to the light- transmitting member is adjusted using an optical member, to correct the optical axis deviation of the laser beam.

4. The drawing method according to claim 1, wherein a pedestal section to which the thermal recording medium is fixed is moved to adjust an entrance angle, an entrance position, or both of the laser beam with respect to the light-transmitting member, to correct the optical axis deviation of the laser beam.

5. The drawing method according to claim 1, wherein the correction amount is calculated on a basis of a result of predicting the optical axis deviation of the laser beam, and input image information is corrected on a basis of the correction amount.

6. The drawing method according to claim 1, wherein the information regarding the light-transmitting member further comprises a refractive index of the light-transmitting member.

7. The drawing method according to claim 1, wherein the recording layer includes a coloring compound having an electron-donating property, a developer having an electron-accepting property, a photothermal converting agent, and a polymeric material, and drawing is performed on the recording layer through irradiation with the laser beam.

8. The drawing method according to claim 1, wherein the recording layer comprises three layers each having color development tones different from each other.

9. An erasing method used when erasing an image from a thermal recording medium that includes a light-transmitting member above a recording layer, the erasing method comprising:

obtaining information regarding the light-transmitting member, wherein the information regarding the light-transmitting member comprises a surface shape of the light-transmitting member, and wherein the surface shape is not flat;

predicting an optical axis deviation of a laser beam in the recording layer from the information regarding the light-transmitting member; and calculating a correction amount from a result of the predicting of the optical axis deviation.

10. The erasing method according to claim 9, wherein the recording layer includes a coloring compound having an electron-donating property, a developing/reducing agent having an electron-accepting property, a photothermal converting agent, and a polymeric material, and the image drawn on the recording layer is erased through irradiation with the laser beam.

11. The erasing method according to claim 9, wherein the recording layer comprises three layers each having color development tones different from each other.

12. A drawing apparatus, comprising:
a light source section that emits a laser beam;
a scanner section that performs scanning on a thermal recording medium with the laser beam emitted from the light source section, the thermal recording medium including a light-transmitting member above a recording layer, wherein the recording layer comprises three layers each having color development tones different from each other;
a reception section that obtains information regarding the light-transmitting member; and
a correction section that predicts, from the information regarding the light-transmitting member, an optical axis deviation of the laser beam in the recording layer and calculates a correction amount from a result of the prediction, the information being obtained by the reception section, and the laser beam being transmitted through the light-transmitting member.

13. The drawing apparatus according to claim 12, further comprising a control section, wherein
the correction section feeds back a result of the calculation of the correction amount to the control section.

14. The drawing apparatus according to claim 13, wherein the control section determines the correction amount on a basis of the result of the calculation of the correction amount fed back from the correction section.

15. The drawing apparatus according to claim 14, wherein the control section corrects an input image signal on a basis of the calculated correction amount.

16. The drawing apparatus according to claim 12, wherein
the scanner section includes a first optical member and a second optical member,
the first optical member performing scanning on the thermal recording medium with the laser beam emitted from the light source section, the thermal recording medium including the light-transmitting member above the recording layer, and
the second optical member adjusting an entrance angle, an entrance position, or both of the laser beam entering the light-transmitting member.

17. The drawing apparatus according to claim 16, further comprising a first adjustment mechanism that adjusts the second optical member on a basis of the correction amount calculated by the correction section.

18. The drawing apparatus according to claim 12, further comprising a pedestal section that fixes the thermal recording medium.

19. The drawing apparatus according to claim 18, further comprising a second adjustment mechanism that adjusts a position and an angle of the pedestal section on a basis of the correction amount calculated by the correction section.

20. The drawing apparatus according to claim 12, wherein the recording layer includes a coloring compound having an electron-donating property, a developer or developing/reducing agent that has an electron-accepting property, a photothermal converting agent, and a polymeric material.

* * * * *